United States Patent
Jetcheva et al.

(10) Patent No.: US 9,977,450 B2
(45) Date of Patent: May 22, 2018

(54) MICRO-BALANCE EVENT RESOURCE SELECTION

(71) Applicant: FUJITSU LIMITED, Kawasaki-shi, Kanagawa (JP)

(72) Inventors: Jorjeta G. Jetcheva, San Jose, CA (US); Maryam Kazerooni, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/864,686

(22) Filed: Sep. 24, 2015

(65) Prior Publication Data

US 2017/0090498 A1 Mar. 30, 2017

(51) Int. Cl.
*G05B 15/02* (2006.01)
*G05F 1/66* (2006.01)
*G06Q 10/06* (2012.01)
*G06Q 50/06* (2012.01)

(52) U.S. Cl.
CPC ............ *G05F 1/66* (2013.01); *G05B 15/02* (2013.01); *G06Q 10/06312* (2013.01); *G06Q 50/06* (2013.01)

(58) Field of Classification Search
CPC .... G05B 15/02; G05F 1/66; G06Q 10/06312; G06Q 50/06
See application file for complete search history.

(56) References Cited

U.S. PATENT DOCUMENTS

| 2011/0015799 | A1  | 1/2011 | Pollack et al. |
| 2013/0036311 | A1  | 2/2013 | Akyol et al. |
| 2015/0019275 | A1* | 1/2015 | Koch ................. G06Q 10/0631 705/7.12 |
| 2015/0170171 | A1* | 6/2015 | McCurnin .......... G06Q 30/0202 705/7.31 |

(Continued)

FOREIGN PATENT DOCUMENTS

WO 2008/073453 A1 6/2008

OTHER PUBLICATIONS

A.-H. Mohsenian-Rad, A. Leon-Garcia, "Optimal Residential Load Control With Price Prediction in Real-Time Electricity Pricing Environments," Smart Grid, IEEE Transactions on , vol. 1, No. 2, pp. 120,133, Sep. 2010.

(Continued)

*Primary Examiner* — Yuhui R Pan
(74) *Attorney, Agent, or Firm* — Maschoff Brennan

(57) ABSTRACT

A method includes a resource selection for a control sub-slot of a balance event. The method includes computing availability schedules and creating a priority list of resources. The priority list includes an order in which the resources are added to a sub-group activated in the control sub-slot. The method includes calculating a resource capacity of the sub-group. The method includes receiving an energy target. If the resource capacity is less than the energy target, the method may include adding one of the resources that has a first position on the priority list to the sub-group and calculating an updated resource capacity. The method (Continued)

includes determining whether the updated sub-group resource capacity is greater than or equal to the energy target. If the updated sub-group resource capacity is greater than or equal to the energy target, the method may include communicating a command signal to the resources.

20 Claims, 23 Drawing Sheets

(56) References Cited

U.S. PATENT DOCUMENTS

2015/0206083 A1    7/2015  Chen et al.

OTHER PUBLICATIONS

C. Tsung-Hui, M. Alizadeh, A. Scaglione, "Coordinated home energy management for real-time power balancing," Power and Energy Society General Meeting, 2012 IEEE, vol., No., pp. 1,8, Jul. 22-26, 2012.
S. Kishore, L. V. Snyder, "Control Mechanisms for Residential Electricity Demand in SmartGrids," Smart Grid Communications (SmartGridComm), 2010 First IEEE International Conference on, vol., No., pp. 443,448, Oct. 4-6, 2010.
S. Abras, S. Ploix, S. Pesty, and M. Jacomino, "A multi-agent design for a home automation system dedicated to power management," In Artificial Intelligence and Innovations 2007: from Theory to Applications, pp. 233-241. Springer, Boston, 2007.
Pending U.S. Appl. No. 14/586,315, filed Dec. 30, 2014.
Pending U.S. Appl. No. 14/594,015, filed Jan. 9, 2015.
Pending U.S. Appl. No. 14/594,008, filed Jan. 9, 2015.
Ovidiu Vermesan et al: "Internet of Things: Converging Technologies for Smart Environments and Integrated Ecosystems", Jun. 5, 2013 (Jun. 5, 2013), River Publishers, XP055275487, ISBN: 978-87-298-273-5 pp. i-xiv, Ch01-Ch02.
Aaron Zurborg: "Unlocking Customer Value: The Virtual Power Plant", worldPower2010, Aug. 3, 2010 (Aug. 3, 2010), XP055275852, Retrieved from the Internet: URL:http://energy.gov/sites/prod/files/oeprod/DocumentsandMedia/ABB_Attachment.pdf [retrieved on May 27, 2016].
Peter Asmus et al: "Digital Energy Networks—Mission Critical Power Meets R0I", Internet Article, Oct. 25, 2012 (Oct. 25, 2012), XP055275979, Retrieved from the Internet: URL:http://www.bluepi11ar.com/BluePi11ar/media/PDFs/Pike_Research_Blue_Pillar_White_Paper_102512_Final.pdf [retrieved on May 27, 2016], pp. 8-12.
Padhy N P: "Unit Commitment—A Bibliographical Survey", IEEETransactions on Power Systems, IEEE Servicecenter, Piscataway, NJ, US, vol. 19, No. 2, May 1, 2004 (May 1, 2004), pp. 1196-1205, XP011112227, ISSN: 0885-8950, D0I: 10.1109/TPWRS.2003.821611.
Wikipedia: "Sorted array", Internet Article, Aug. 3, 2015 (Aug. 3, 2015), XP055276102, Retrieved from the Internet: URL:https://en.wikipedia.Org/w/index.php7title=Sorted_array&oldi d=675912806 [retrieved on May 30, 2016].
Wikipedia: "Load balancing (electrical power)", Internet Article, Mar. 20, 2015 (Mar. 20, 2015), XP055276110, Retrieved from the Internet: URL:https://en.wikipedia.Org/w/index.php7title=Load_balanci ng_(electri cal_power)&oldid=652722110 [retrieved on May 30, 2016].
Wikipedia: "Virtuelles Kraftwerk", Internetarticle, Aug. 31, 2014 (Aug. 31, 2014), XP055276117, Retrieved from the Internet: URL:https://de.wikipedia.Org/w/index.php7title=Virtuel1es_Kraftwerk&oldi d=133596396 [retrieved on May 30, 2016].
European Search Report for corresponding application No. 16164043.8, dated Jun. 7, 2016.

* cited by examiner

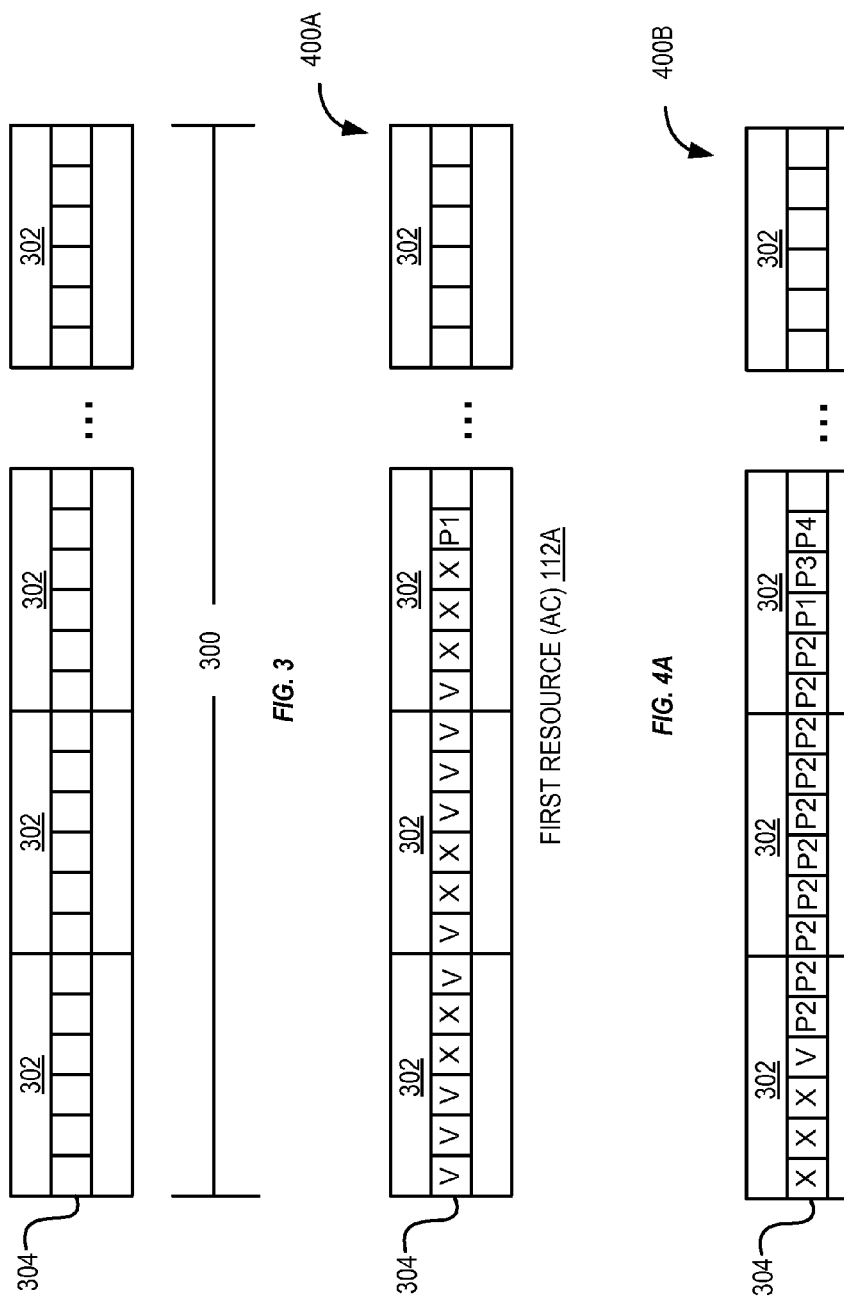

FIRST RESOURCE (AC) 112A

| 1 | 2 | 3 | 4 | 5 | 6 | 7 | 8 | 9 | 10 | 11 | 12 | 13 |
|---|---|---|---|---|---|---|---|---|---|---|---|---|
| 0 | 1 | 10*1/11 | 9*1/11 | 8*1/11 | 7*1/11 | 6*1/11 | 5*1/11 | 4*1/11 | 3*1/11 | 2*1/11 | 1/11 | 1.01 |
| M | D1 | D2 | D3 | D4 | D5 | D6 | D7 | D8 | D9 | D10 | D11 | U |

SITE 130

| 1 | 2 | 3 | 4 | ... | ... | ... | ... | 106 | 107 | 108 | 109 |
|---|---|---|---|-----|-----|-----|-----|-----|-----|-----|-----|
| 0 | 1 | 108*1/109 | 107*1/109 | ... | ... | ... | ... | 4*1/109 | 3*1/109 | 2*1/109 | 1/109 |
| M | D1 | D2 | D3 | ... | ... | ... | ... | D106 | D107 | D108 | D109 |

304

First Raw Data Table 500

| Addition Order 502 | Control Status 504 | Availability Interval End Time 506 | Previous Participation 508 | Capacity 510 | Resource Id 512 | Resource Type 514 |
|---|---|---|---|---|---|---|
| TBD | P1 | T1 | N1 | C1 | 1 | A/C |
| TBD | P3 | T1 | N1 | C2 | 2 | EV |
| TBD | P2 | T1 | N2 | C2 | 3 | EV |
| TBD | P1 | T2 | N2 | C1 | 4 | WATER HEATER |
| TBD | P2 | T2 | N3 | C3 | 5 | A/C |
| TBD | P1 | T2 | N1 | C2 | 6 | PV |
| TBD | P2 | T3 | N2 | C1 | 7 | EV |
| TBD | P2 | T3 | N1 | C3 | 8 | EV |
| TBD | P2 | T3 | N2 | C2 | 9 | PV |
| TBD | P2 | T4 | N1 | C4 | 10 | PV |
| TBD | P2 | T3 | N2 | C2 | 11 | A/C |
| TBD | P3 | T4 | N1 | C1 | 12 | A/C |
| TBD | P3 | T4 | N3 | C2 | 13 | PV |
| TBD | P3 | T4 | N4 | C3 | 14 | EV |
| TBD | P3 | T1 | N1 | C1 | 15 | A/C |
| TBD | P4 | T1 | N1 | C2 | 16 | WATER HEATER |
| TBD | P4 | T2 | N2 | C1 | 17 | WATER HEATER |
| TBD | P4 | T2 | N1 | C1 | 18 | PV |

*FIG. 5A*

FIRST PRIORITY LIST 501A

| Addition Order 502 | Control Status 504 | Availability Interval End Time 506 | Previous Participation 508 | Capacity 510 | Resource Id 512 | Resource Type 514 |
|---|---|---|---|---|---|---|
| 1 | P1 | T1 | N1 | C1 | 1 | A/C |
| 2 | P1 | T2 | N1 | C2 | 6 | PV |
| 3 | P1 | T2 | N2 | C1 | 4 | WATER HEATER |
| 4 | P2 | T1 | N2 | C2 | 3 | EV |
| 5 | P2 | T2 | N3 | C3 | 5 | A/C |
| 6 | P2 | T3 | N1 | C1 | 8 | EV |
| 7 | P2 | T3 | N2 | C3 | 7 | EV |
| 8 | P2 | T3 | N2 | C1 | 9 | PV |
| 9 | P2 | T3 | N2 | C4 | 11 | A/C |
| 10 | P2 | T4 | N1 | C2 | 10 | PV |
| 11 | P3 | T1 | N1 | C2 | 2 | EV |
| 12 | P3 | T4 | N1 | C3 | 15 | A/C |
| 13 | P3 | T4 | N1 | C2 | 12 | A/C |
| 14 | P3 | T4 | N3 | C1 | 13 | PV |
| 15 | P3 | T4 | N4 | C2 | 14 | EV |
| 16 | P4 | T1 | N1 | C1 | 16 | WATER HEATER |
| 17 | P4 | T2 | N1 | C1 | 18 | PV |
| 18 | P4 | T2 | N2 | C2 | 17 | WATER HEATER |

*FIG. 5B*

SECOND PRIORITY LIST 501B

| Addition Order 502 | Control Status 504 | Availability Interval End Time 506 | Previous Participation 508 | Capacity 510 | Resource Id 512 | Resource Type 514 |
|---|---|---|---|---|---|---|
| 1 | P1 | T1 | N1 | C1 | 1 | A/C |
| 2 | P2 | T2 | N3 | C3 | 5 | A/C |
| 3 | P2 | T3 | N2 | C4 | 11 | A/C |
| 4 | P3 | T4 | N1 | C2 | 12 | A/C |
| 5 | P3 | T1 | N1 | C3 | 15 | A/C |
| 6 | P3 | T1 | N2 | C2 | 2 | EV |
| 7 | P2 | T3 | N2 | C2 | 3 | EV |
| 8 | P2 | T4 | N1 | C1 | 7 | EV |
| 9 | P2 | T4 | N4 | C2 | 8 | EV |
| 10 | P3 | T2 | N1 | C2 | 14 | EV |
| 11 | P1 | T3 | N1 | C3 | 6 | PV |
| 12 | P2 | T4 | N2 | C2 | 9 | PV |
| 13 | P2 | T4 | N1 | C1 | 10 | PV |
| 14 | P3 | T2 | N3 | C1 | 13 | PV |
| 15 | P4 | T2 | N1 | C1 | 18 | PV |
| 16 | P1 | T1 | N2 | C1 | 4 | WATER HEATER |
| 17 | P4 | T1 | N1 | C1 | 16 | WATER HEATER |
| 18 | P4 | T2 | N2 | C2 | 17 | WATER HEATER |

*FIG. 5C*

THIRD PRIORITY LIST 501C

| Addition Order 502 | Control Status 504 | Availability Interval End Time 506 | Previous Participation 508 | Capacity 510 | Resource Id 512 | Resource Type 514 |
|---|---|---|---|---|---|---|
| 1 | P1 | T1 | N1 | C1 | 1 | A/C |
| 2 | P2 | T2 | N3 | C3 | 5 | A/C |
| 3 | P2 | T3 | N2 | C4 | 11 | A/C |
| 4 | P3 | T1 | N1 | C3 | 15 | A/C |
| 5 | P3 | T4 | N2 | C2 | 12 | A/C |
| 6 | P2 | T1 | N1 | C2 | 3 | EV |
| 7 | P2 | T3 | N2 | C1 | 8 | EV |
| 8 | P2 | T3 | N4 | C2 | 7 | EV |
| 9 | P3 | T1 | N1 | C2 | 2 | EV |
| 10 | P3 | T4 | N1 | C2 | 14 | EV |
| 11 | P1 | T2 | N2 | C3 | 6 | PV |
| 12 | P2 | T3 | N1 | C2 | 9 | PV |
| 13 | P2 | T4 | N3 | C1 | 10 | PV |
| 14 | P3 | T4 | N1 | C1 | 13 | PV |
| 15 | P4 | T2 | N2 | C1 | 18 | PV |
| 16 | P1 | T2 | N1 | C1 | 4 | WATER HEATER |
| 17 | P4 | T1 | N1 | C1 | 16 | WATER HEATER |
| 18 | P4 | T2 | N2 | C2 | 17 | WATER HEATER |

*FIG. 5D*

Second Raw Data Table 600

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | U | 1.01 | TBD | T1 | W1 | $1.25 | C1 | 1 | A/C |
| TBD | M | 0 | TBD | T1 | W1 | $1.50 | C2 | 2 | EV |
| TBD | D1 | 0.8 | TBD | T1 | W2 | $1.75 | C2 | 3 | EV |
| TBD | D2 | 0.5 | TBD | T2 | W2 | $2.25 | C1 | 4 | WATER HEATER |
| TBD | M | 0 | TBD | T2 | W3 | $1.25 | C3 | 5 | A/C |
| TBD | D3 | 0.25 | TBD | T2 | W1 | $2.45 | C2 | 6 | PV |
| TBD | U | 1.01 | TBD | T3 | W2 | $3.00 | C1 | 7 | EV |
| TBD | M | 0 | TBD | T3 | W1 | $1.45 | C1 | 8 | EV |
| TBD | D1 | 0.8 | TBD | T3 | W2 | $2.15 | C3 | 9 | PV |
| TBD | D2 | 0.5 | TBD | T4 | W2 | $3.50 | C2 | 10 | PV |
| TBD | D3 | 0.25 | TBD | T3 | W1 | $2.00 | C4 | 11 | A/C |
| TBD | M | 0 | TBD | T4 | W3 | $1.75 | C2 | 12 | A/C |
| TBD | U | 1.01 | TBD | T4 | W4 | $2.05 | C1 | 13 | PV |
| TBD | D3 | 0.25 | TBD | T4 | W1 | $0.55 | C2 | 14 | EV |
| TBD | D1 | 0.8 | TBD | T1 | | $0.25 | C3 | 15 | A/C |
| TBD | M | 0 | TBD | T1 | W1 | $1.25 | C1 | 16 | WATER HEATER |
| TBD | U | 1.01 | TBD | T2 | W2 | $3.40 | C2 | 17 | WATER HEATER |
| TBD | D1 | 0.8 | TBD | T2 | W1 | $2.00 | C3 | 18 | PV |

FIG. 6A

First Intermediate List 601A

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | M | 0 |   | T1 | N1 | $1.50 | C2 | 2 | EV |
| TBD | M | 0 |   | T2 | N3 | $1.25 | C3 | 5 | A/C |
| TBD | M | 0 | 1 | T3 | N1 | $1.45 | C1 | 8 | EV |
| TBD | M | 0 |   | T4 | N1 | $1.75 | C2 | 12 | A/C |
| TBD | M | 0 |   | T1 | N1 | $1.25 | C1 | 16 | WATER HEATER |
| TBD | D3 | 0.25 |   | T2 | N1 | $2.45 | C2 | 6 | PV |
| TBD | D3 | 0.25 | 2 | T3 | N2 | $2.00 | C4 | 11 | A/C |
| TBD | D3 | 0.25 |   | T4 | N4 | $0.55 | C2 | 14 | EV |
| TBD | D2 | 0.5 | 3 | T2 | N2 | $2.25 | C1 | 4 | WATER HEATER |
| TBD | B2 | 0.5 |   | T4 | N1 | $3.50 | C2 | 10 | PV |
| TBD | B1 | 0.8 | 4 | T1 | N2 | $1.75 | C2 | 3 | EV |
| TBD | B1 | 0.8 |   | T3 | N2 | $2.15 | C3 | 9 | PV |
| TBD | D1 | 0.8 |   | T1 | N1 | $0.25 | C3 | 15 | A/C |
| TBD | D1 | 0.8 |   | T2 | N1 | $2.00 | C1 | 18 | PV |
| TBD | U | 1.01 | 5 | T1 | N1 | $1.25 | C1 | 1 | A/C |
| TBD | U | 1.01 |   | T3 | N2 | $3.00 | C1 | 7 | EV |
| TBD | U | 1.01 |   | T4 | N3 | $2.05 | C1 | 13 | PV |
| TBD | U | 1.01 |   | T2 | N2 | $3.40 | C2 | 17 | WATER HEATER |

FIG. 6B

Second Intermediate List 601B

| Solution Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | M | 0 | | T2 | N3 | $1.25 | C3 | 5 | A/C |
| TBD | M | 0 | 1 | T1 | N1 | $1.25 | C1 | 16 | WATER HEATER |
| TBD | M | 0 | | T3 | N1 | $1.45 | C1 | 8 | EV |
| TBD | M | 0 | | T4 | N1 | $1.75 | C2 | 12 | A/C |
| TBD | M | 0 | | T1 | N2 | $1.50 | C4 | 2 | EV |
| TBD | D3 | 0.25 | 2 | T3 | N1 | $2.00 | C2 | 11 | A/C |
| TBD | D3 | 0.25 | | T2 | N4 | $2.45 | C2 | 6 | PV |
| TBD | D3 | 0.25 | | T4 | N1 | $0.55 | C2 | 14 | EV |
| TBD | D2 | 0.5 | 3 | T4 | N2 | $3.50 | C1 | 10 | PV |
| TBD | D2 | 0.5 | | T2 | N1 | $2.25 | C1 | 4 | WATER HEATER |
| TBD | D1 | 0.8 | 4 | T2 | N2 | $2.00 | C3 | 18 | PV |
| TBD | D1 | 0.8 | | T3 | N1 | $2.15 | C3 | 9 | PV |
| TBD | D1 | 0.8 | | T1 | N2 | $0.25 | C2 | 15 | A/C |
| TBD | D1 | 0.8 | | T1 | N2 | $1.75 | C1 | 3 | EV |
| TBD | U | 1.01 | 5 | T2 | N2 | $3.40 | C2 | 17 | WATER HEATER |
| TBD | U | 1.01 | | T1 | N1 | $1.25 | C1 | 1 | A/C |
| TBD | U | 1.01 | | T3 | N2 | $3.00 | C1 | 7 | EV |
| TBD | U | 1.01 | | T4 | N3 | $2.65 | C1 | 13 | PV |

*FIG. 6C*

Fourth Priority List 601C

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| 1 | M | 0 |  | T2 | N0 | $1.25 | C3 | 5 | A/C |
| 2 | M | 0 |  | T1 | N1 | $1.25 | C1 | 16 | WATER HEATER |
| 3 | M | 0 |  | T3 | N1 | $1.45 | C1 | 8 | EV |
| 4 | M | 0 |  | T4 | N1 | $1.75 | C2 | 12 | EV |
| 5 | M | 0 |  | T1 | N1 | $1.50 | C2 | 2 | EV |
| 6 | B3 | 0.25 |  | T3 | N2 | $2.00 | C4 | 11 | A/C |
| 7 | B3 | 0.25 | 2 | T2 | N1 | $2.45 | C2 | 6 | PV |
| 8 | B3 | 0.25 |  | T4 | N4 | $0.55 | C2 | 14 | EV |
| 9 | B2 | 0.5 |  | T4 | N1 | $3.50 | C2 | 10 | PV |
| 10 | B2 | 0.5 | 3 | T2 | N2 | $2.25 | C1 | 4 | WATER HEATER |
| 11 | D1 | 0.8 |  | T2 | N1 | $2.00 | C1 | 18 | PV |
| 12 | D1 | 0.8 | 4 | T1 | N1 | $0.25 | C3 | 15 | PV |
| 13 | D1 | 0.8 |  | T3 | N2 | $2.15 | C3 | 9 | A/C |
| 14 | D1 | 0.8 |  | T1 | N2 | $1.75 | C2 | 3 | EV |
| 15 | U | 1.01 |  | T2 | N2 | $3.40 | C2 | 17 | WATER HEATER |
| 16 | U | 1.01 | 5 | T1 | N1 | $1.25 | C1 | 1 | A/C |
| 17 | U | 1.01 |  | T3 | N2 | $3.00 | C1 | 7 | EV |
| 18 | U | 1.01 |  | T4 | N3 | $2.05 | C1 | 13 | PV |

*FIG. 6D*

Third Intermediate List 601D

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | D1 | 0.8 | 1 | T1 | N1 | $0.25 | C3 | 15 | A/C |
| TBD | D3 | 0.25 | 1 | T4 | N4 | $0.55 | C2 | 14 | EV |
| TBD | U | 1.01 | 1 | T1 | N1 | $1.25 | C1 | 1 | EV |
| TBD | M | 0 | 1 | T2 | N3 | $1.25 | C3 | 5 | A/C |
| TBD | M | 0 | 1 | T1 | N1 | $1.25 | C1 | 16 | WATER HEATER |
| TBD | M | 0 | 2 | T3 | N1 | $1.45 | C1 | 8 | EV |
| TBD | M | 0 | 2 | T1 | N1 | $1.50 | C2 | 2 | EV |
| TBD | D1 | 0.8 | 2 | T1 | N2 | $1.75 | C2 | 3 | EV |
| TBD | M | 0 | 2 | T4 | N1 | $1.75 | C4 | 12 | A/C |
| TBD | D3 | 0.25 | 2 | T3 | N2 | $2.00 | C1 | 11 | A/C |
| TBD | D1 | 0.8 | 2 | T2 | N1 | $2.00 | C1 | 18 | PV |
| TBD | U | 1.01 | 2 | T4 | N3 | $2.05 | C3 | 13 | PV |
| TBD | D1 | 0.8 | 2 | T3 | N2 | $2.15 | C3 | 9 | PV |
| TBD | D2 | 0.5 | 2 | T2 | N2 | $2.25 | C1 | 4 | WATER HEATER |
| TBD | D3 | 0.25 | 3 | T2 | N1 | $2.45 | C2 | 6 | PV |
| TBD | U | 1.01 | 3 | T3 | N2 | $3.00 | C1 | 7 | EV |
| TBD | U | 1.01 | 3 | T2 | N2 | $3.40 | C2 | 17 | WATER HEATER |
| TBD | D2 | 0.5 | 3 | T4 | N1 | $3.50 | C2 | 10 | PV |

FIG. 6E

Fourth Intermediate List 601E

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | M | 0 | 1 | T2 | N3 | $1.25 | C3 | 5 | A/C |
| TBD | M | 0 | 1 | T1 | N1 | $1.25 | C1 | 16 | WATER HEATER |
| TBD | D3 | 0.25 | 1 | T4 | N4 | $0.55 | C2 | 14 | EV |
| TBD | D1 | 0.8 | 1 | T1 | N1 | $0.25 | C3 | 15 | EV |
| TBD | U | 1.01 | 1 | T1 | N1 | $1.25 | C1 | 1 | A/C |
| TBD | M | 0 | 2 | T3 | N1 | $1.45 | C2 | 8 | EV |
| TBD | M | 0 | 2 | T4 | N1 | $1.75 | C1 | 12 | A/C |
| TBD | D3 | 0.25 | 2 | T1 | N1 | $1.50 | C2 | 2 | EV |
| TBD | D2 | 0.5 | 2 | T3 | N2 | $2.00 | C4 | 11 | A/C |
| TBD | D2 | 0.5 | 2 | T2 | N2 | $2.25 | C1 | 4 | WATER HEATER |
| TBD | D1 | 0.8 | 2 | T2 | N1 | $2.00 | C1 | 18 | PV |
| TBD | D1 | 0.8 | 2 | T3 | N2 | $2.15 | C3 | 9 | PV |
| TBD | D1 | 0.8 | 2 | T1 | N2 | $1.75 | C1 | 3 | EV |
| TBD | U | 1.01 | 2 | T4 | N3 | $2.05 | C1 | 13 | PV |
| TBD | D3 | 0.25 | 3 | T2 | N1 | $2.45 | C2 | 6 | PV |
| TBD | D2 | 0.5 | 3 | T4 | N1 | $3.50 | C1 | 10 | PV |
| TBD | U | 1.01 | 3 | T2 | N2 | $3.40 | C2 | 17 | WATER HEATER |
| TBD | U | 1.01 | 3 | T3 | N2 | $3.00 | C1 | 7 | EV |

FIG. 6F

Fifth Intermediate List 601F

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| TBD | M | 0 | 1.1 | T2 | N3 | $1.25 | C3 | 5 | A/C |
| TBD | M | 0 | 1.1 | T1 | N1 | $1.25 | C1 | 16 | WATER HEATER |
| TBD | D3 | 0.25 | 1.1 | T4 | N4 | $0.55 | C2 | 14 | EV |
| TBD | D1 | 0.8 | 1.2 | T1 | N1 | $0.25 | C3 | 15 | A/C |
| TBD | U | 1.01 | 1.2 | T1 | N1 | $1.25 | C1 | 1 | A/C |
| TBD | M | 0 | 2.1 | T3 | N1 | $1.45 | C2 | 8 | EV |
| TBD | M | 0 | 2.1 | T4 | N1 | $1.75 | C2 | 12 | A/C |
| TBD | D3 | 0.25 | 2.1 | T1 | N1 | $1.80 | C2 | 2 | EV |
| TBD | D2 | 0.5 | 2.1 | T3 | N2 | $2.00 | C4 | 11 | A/C |
| TBD | D1 | 0.8 | 2.2 | T2 | N1 | $2.25 | C1 | 4 | WATER HEATER |
| TBD | D1 | 0.8 | 2.2 | T2 | N2 | $2.00 | C1 | 18 | PV |
| TBD | D1 | 0.8 | 2.2 | T3 | N2 | $2.15 | C3 | 9 | PV |
| TBD | U | 1.01 | 2.2 | T1 | N2 | $1.75 | C2 | 3 | EV |
| TBD | D3 | 0.25 | 2.2 | T4 | N3 | $2.05 | C1 | 13 | PV |
| TBD | D2 | 0.5 | 3.1 | T2 | N1 | $2.45 | C2 | 6 | PV |
| TBD | U | 1.01 | 3.1 | T4 | N1 | $3.50 | C2 | 10 | PV |
| TBD | U | 1.01 | 3.2 | T2 | N2 | $3.40 | C2 | 17 | WATER HEATER |
| TBD | U | 1.01 | 3.2 | T3 | N2 | $3.00 | C1 | 7 | EV |

FIG. 6G

Fifth Priority List 601G

| Addition Order 602 | Control Status 604 | Decimal Value 605 | Cluster 607 | Availability Interval End Time 606 | Previous Participation 608 | Cost or Incentive 609 | Capacity 610 | Resource Id 612 | Resource Type 614 |
|---|---|---|---|---|---|---|---|---|---|
| 1 | M | 0 | 1,1 | T2 | N3 | $1.25 | C3 | 5 | A/C |
| 2 | M | 0 | 1,1 | T1 | N1 | $1.25 | C1 | 16 | WATER HEATER |
| 3 | D3 | 0.25 | 1,1 | T4 | N4 | $0.55 | C2 | 14 | EV |
| 4 | D | 1.01 | 1,2 | T1 | N1 | $1.25 | C1 | 1 | A/C |
| 5 | D1 | 0.8 | 1,2 | T3 | N1 | $0.25 | C3 | 15 | A/C |
| 6 | M | 0 | 2,1 | T3 | N2 | $1.43 | C1 | 8 | EV |
| 7 | D3 | 0.25 | 2,1 | T3 | N1 | $2.00 | C4 | 11 | A/C |
| 8 | M | 0 | 2,1 | T4 | N1 | $1.75 | C2 | 12 | A/C |
| 9 | M | 0 | 2,1 | T1 | N1 | $1.50 | C2 | 2 | EV |
| 10 | D1 | 0.8 | 2,2 | T2 | N1 | $2.00 | C1 | 18 | PV |
| 11 | D2 | 0.5 | 2,2 | T2 | N2 | $2.25 | C1 | 4 | WATER HEATER |
| 12 | D1 | 0.8 | 2,2 | T3 | N2 | $2.15 | C3 | 9 | PV |
| 13 | D | 1.01 | 2,2 | T4 | N3 | $2.05 | C1 | 13 | PV |
| 14 | D1 | 0.8 | 2,2 | T1 | N2 | $1.75 | C2 | 3 | EV |
| 15 | D2 | 0.5 | 3,1 | T4 | N2 | $3.50 | C2 | 10 | PV |
| 16 | D3 | 0.25 | 3,1 | T2 | N1 | $2.45 | C2 | 6 | PV |
| 17 | D | 1.01 | 3,2 | T2 | N2 | $3.40 | C2 | 17 | WATER HEATER |
| 18 | D | 1.01 | 3,2 | T3 | N2 | $3.00 | C1 | 7 | EV |

FIG. 6H

MICRO-BALANCE EVENT RESOURCE SELECTION

FIELD

The embodiments discussed herein are related to micro-balance event resource selection.

BACKGROUND

Utilities incentivize curtailment of energy usage and energy production during certain high load periods to increase the ability of the utilities to meet a larger demand or to reduce production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. Similarly, the utility may increase energy production during the late afternoon to meet a load imposed on the utility during the late afternoon. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

Some electrical distribution systems may include distributed energy production and centralized energy production. For instance, an electrical distribution system may include a utility such as a coal power plant and multiple houses that are fit with photovoltaic (PV) panels. The houses with PV panels are an example of site-level energy production. The distributed energy may be integrated into the electrical distribution system. Accordingly, a portion of energy produced by the PV panels may be introduced into and distributed via the electrical grid.

The electrical distribution systems may include multiple sites. Groups of the sites may be organized as a virtual power plant (VPP). For example, the sites that include energy production capabilities may be organized into a VPP. When grouped into the VPP energy production and energy use of the sites included in the VPP may be collectively managed.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes a resource selection for a control sub-slot of a micro-balance event. The method may include computing availability schedules for one or more resources. The method may include creating a priority list of the resources based on one or more prioritization rules and the availability schedules. The priority list may include an order in which the resources are added to a controlled sub-group that are activated during the micro-balance event. The method may include calculating a sub-group resource capacity that includes a sum of resource capacities of a subset of the resources included in the controlled sub-group. The method may include receiving an energy target. The energy target may include an energy amount to be balanced during the energy balance event. The method may include determining whether the sub-group resource capacity is greater than or equal to the energy target. In response to a determination that the sub-group resource capacity is less than the energy target, the method may include adding one of the resources that has a first position on the priority list to the controlled sub-group and calculating an updated sub-group resource capacity that includes the sub-group resource capacity and a resource capacity of the added resource. The method may include determining whether the updated sub-group resource capacity is greater than or equal to the energy target. In response to a determination that the updated sub-group resource capacity is greater than or equal to the energy target, the method may include communicating a command signal to the resources in the controlled sub-group that control an operational state of the resources.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is a block diagram of an overall duration for a balance event that may be implemented in the distribution system of FIG. 1;

FIGS. 4A-4D represent example availability schedules that may be implemented in the distribution system of FIG. 1;

FIG. 5A is a first raw data table that may be implemented in the distribution system of FIG. 1;

FIG. 5B is an example priority list generated from the first raw data table of FIG. 5A;

FIG. 5C is another example priority list generated from the first raw data table of FIG. 5A;

FIG. 5D is another example priority list generated from the first raw data table of FIG. 5A;

FIG. 6A is a second raw data table that may be implemented in the distribution system of FIG. 1;

FIG. 6B is an example first intermediate list generated from the second raw data table of FIG. 6A;

FIG. 6C is an example second intermediate list generated from the second raw data table of FIG. 6A;

FIG. 6D is an example fourth priority list generated from the second raw data table of FIG. 6A;

FIG. 6E is an example third intermediate list generated from the second raw data table of FIG. 6A;

FIG. 6F is an example fourth intermediate list generated from the second raw data table of FIG. 6A;

FIG. 6G is an example fifth intermediate list generated from the second raw data table of FIG. 6A;

FIG. 6H is an example fifth priority list generated from the second raw data table of FIG. 6A;

DESCRIPTION OF EMBODIMENTS

Figure 1:
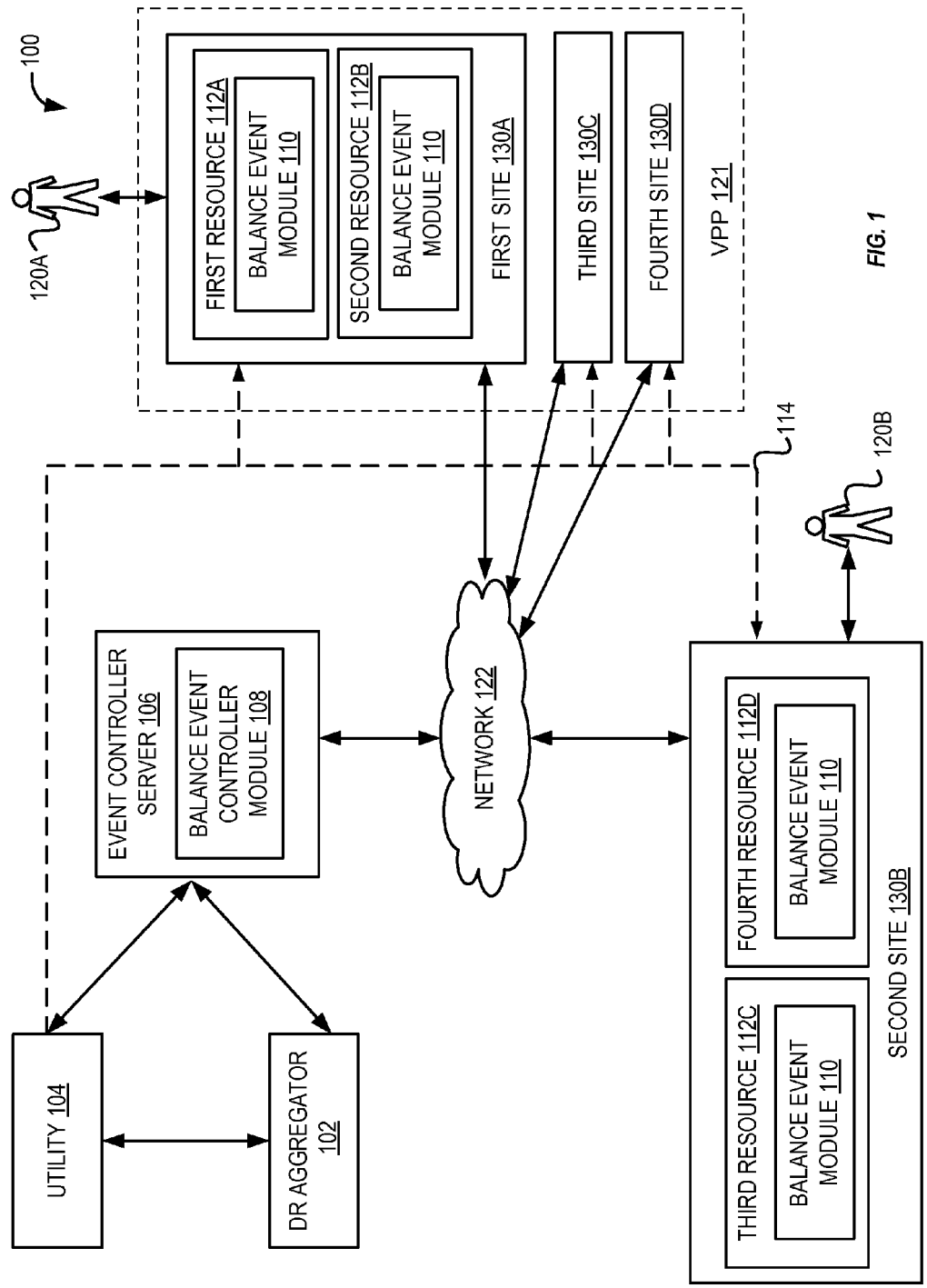
FIG. 1 is a block diagram of an example distribution system.

Balance events generally include periods in which a utility and/or a demand response (DR) aggregator curtail, incentivize curtailment of energy usage, increase energy production, or incentivize energy production. An example of a balance event is a DR curtailment event. A DR curtailment event may be implemented when energy prices provide a motive to curtail energy. During the DR curtailment event, the utility may incentivize curtailment of energy use, which may enable the utility to sell the energy on the energy market. Another example of the balance event may include a DR supply event. A DR supply event may occur under similar motivations to the DR curtailment event. In the DR supply event, the utility may incentivize production of energy usage. The generate energy may be sold on an energy market, for instance. A third example of the balance event may include a DR load event. A DR load event may occur under circumstances in which an electrical distribution system has an excess of energy. During a DR load event, resources may be activated to use the excess.

A single balance event may include a DR load event, a DR curtailment event, a DR supply event, or some combination thereof. For instance, an energy market price may motivate a DR curtailment event and concurrent DR supply event. Moreover, one or more of the DR load event, the DR curtailment event, and the DR supply event may occur concurrently at different physical locations.

In some circumstances, such as systems implementing direct load control (DLC) programs, instead of executing a single balance event, multiple micro-balance events may be executed to achieve a similar energy balance. The micro DR events may include state transitions of one or more resources included in the energy distribution system implementing the multiple micro-balance events.

Execution of the micro-balance events may include a sequence of state transitions of one or more subsets of resources. A selection which resources to include and which resources to not include at a particular time may be based at least partially on multiple constraints. For example, in some embodiments described in this disclosure the selection may be based on resource type (e.g., an air condition unit versus a photovoltaic (PV) panel), location of the resources, resource constraints (e.g., wear and tear considerations), customer constraints (e.g., comfort constraints, deadline constraints, customer preference), DR program constraints (e.g., contractual/governmental constraints), other constraints described elsewhere in this disclosure, or some combination thereof.

In some embodiments, the constraints may be categorized as mandatory or 'hard' constraints and non-mandatory or 'soft' constraints. The mandatory constraints may include a minimum amount of time between turning a resource from on to off or vice versa, a number of consecutive time slots in which one or more of the resources may be off, a number of consecutive time slots in which one or more of the resources may be on, a fraction of time one or more of the resources must be on, a fraction of time slots over some period of time that one or more of the resources must be on, and a post-control of a resource constraint. The mandatory constraints may include wear-and-tear constraints. In addition, the mandatory constraints may avoid snap back of the load following a balance event or to ensure that behavior of the resource 112 is predictable over some time period.

The soft constraints may include a number of days or hours per year that a customer is expected to participate in a balance event or in the VPP 121 (e.g., per a contract with VPP provider or government regulations. Therefore, the VPP 121 may want to maximize a number of curtailments requested of one of the customer 120 per day. For instance, once the customer 120 is asked to curtail on a particular day, then the VPP 121 may curtail the same customer 120 as much as possible on that day.

In some embodiments, the balance event may be substantially continuous. Accordingly, transitions of operating state of resources in an electrical distribution system may be constantly or substantially constantly performed to achieve particular energy targets.

While in these and other embodiments the balance event may be substantially continuously, each day (or another suitable duration) may be separated into multiple balance intervals. The multiple balance intervals may be further separated into multiple control sub-slots. For one or more of the control sub-slots, a micro-balance events may be performed that involved a selected subset of available resources. In an example embodiment, the resources may be selected based on availability schedules that may be computed for one or more of the available resources. Based on the availability schedules and a prioritization rules that consider one or more constraints, a priority list is created. The priority list includes the resources organized into an order in which the resources are added to a controlled sub-group. The controlled sub-group may include the resources that are activated during the energy balance event. A sub-group resource capacity may be calculated. The sub-group resource capacity may include a sum of resource capacities of a subset of the resources included in the controlled sub-group.

Based on a comparison between the energy target and the sub-group resource capacity, one or more resources from the priority list may be added to the controlled sub-group. The resources may be added until the sub-group resource capacity exceeds the energy target. Command signals may then be communicated to the resources in the controlled sub-group. The command signals may control an operational state of the resources. For example, the command signal may transition the operation state of the resources e.g., on-to-off, off-to-on, or from a first operational state to another operational state.

This and other embodiments are described herein with reference to the appended drawings. In the appended drawings, items similarly numbered have similar structures unless discussed otherwise.

FIG. 1 is a block diagram of an example distribution system 100 in which micro-balance event resource selection may be implemented. In the distribution system 100, a utility 104 and/or a DR aggregator 102 may implement or control implementation of one or more micro-balance events. The micro-balance events may include transitions in operational state of resources 112A-112D (generally, resource 112 or resources 112) that may be located at one or more sites 130A-130D (generally, site 130 or sites 130). For instance, the micro-balance events may include communication of command signals via a network 122 to the resources 112 that control the operational states of the resources 112.

Control of the operational states of the resources 112 may affect energy use and/or energy production in the distribution system 100. Control of the energy use and the energy production may balance energy use and energy production in the distribution system 100. For example, the sites 130 and/or the resources 112 may use energy produced by the utility 104 or purchased in an energy market. During periods of increased load imposed by the sites 130 and/or resources 112, one or more micro-balance events may be implemented to reduce the load, which may reduce energy purchased in the energy market. Additionally or alternatively, the balance events may be implemented to produce an excess energy in addition to the energy produced by the utility 104. The excess energy may be sold on the energy market. Moreover, the load imposed by the resources 112 may be curtailed while energy production of the resources 112 may be increased, which may create additional excess energy that may be sold to on the energy market.

In the distribution system 100, multiple, sequential micro-balance events may be implemented. One or more of the micro-balance events may involve a subset of the resources 112. In this disclosure, the resources 112 included in one or more of the micro-balance events are referred to as a controlled sub-group. The particular resources 112 included in the controlled sub-group may change between micro-balance events.

For example, in a first micro-balance event, a first resource 112A and a second resource 112B may receive a command signal configured to place the first resource 112A and the second resource 112B in an off operational state. In a subsequent micro-balance event, a third resource 112C and a fourth resource 112D may receive a command signal configured to place the third resource 112C and the fourth resource 112D in an off operational state. In addition, in the subsequent micro-balance event, the first resource 112A and the second resource 112B may receive a command signal configured to place the first resource 112A and the second resource 112B in an on operational state.

In the aggregate, the multiple micro-balance events may provide a similar result as a single balance event. However, implementation of multiple micro-balance events may impact customers 120A and 120B (collectively customers 120 or customer 120) and/or the resources 112 less than the single balance event with similar results.

For example, a DR curtailment event may be scheduled from 3:00 PM on Jan. 1, 2016 until 5:00 PM on Jan. 1, 2016, which may be referred to as the overall duration. A total curtailment of the DR curtailment event may be one megawatt-hour (MWh). The total curtailment may include a sum of curtailments by participating sites (e.g., the sites 130) and/or participating resources (e.g., 112). In a macro DR curtailment event, the utility 104 and/or the DR aggregator 102 may coordinate the curtailment of one MWh by the first resource 112A and the second resource 112B for two hours. A first customer 120A may lose an ability to operate the first resource 112A and the second resource 112B for two hours.

In a micro-DR curtailment event, the utility 104 and/or the DR aggregator 102 may coordinate the curtailment of a first portion of the one MWh by the first resource 112A and the second resource 112B for a first portion of the overall duration. This curtailment may be followed by the curtailment of a second portion of the one MWh by the third resource 112C and the fourth resource 112D for a second portion of the overall duration. During a second curtailment, the first resource 112A and/or the second resource 112B may return to an operational state prior to the micro DR curtailment event. The utility 104 and the DR aggregator 102 may schedule one or more additional micro DR curtailment events until the one MWh is curtailed in the aggregate.

A benefit of the micro-balance events may include a reduction in interruption of the operation of the resources 112. For example, by periodically interrupting operation (e.g., during only the micro event duration), the overall function of the resource 112 may not be affected. Similarly, one or more of the resources 112 may be included in a subset of a series of micro-balance events without necessarily being included in one or more other of the series of micro-balance events. Thus, the utility 104 and/or the DR aggregator 102 may achieve an energy target by distributing curtailment and/or production among a large number of the resources 112, which may reduce perception of the curtailment or the production by customers (e.g., 120).

In the embodiment of FIG. 1, the distribution system 100 includes the utility 104, the DR aggregator 102, the sites 130, and the resources 112, which are collectively referred to as system components. The system components may be configured to communicate data and information related to balance events via the network 122. For example, information pertaining to the resources 112 and command signals may be communicated via the network 122. In the following paragraphs, each of the system components is described.

The network 122 may include wired or wireless, and may have configurations including a star configuration, token ring configuration, or other configurations. Furthermore, the network 122 may include a local area network (LAN), a wide area network (WAN) (e.g., the Internet), and/or other interconnected data paths across which multiple resources may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

The sites 130 may include buildings, structures, equipment, or other objects that use energy distributed by the utility 104. The sites 130 may include multiple types of structures ranging from private residences to large industrial factories or office buildings. In some embodiments, the sites 130 included in the distribution system 100 may be residences and/or small and medium-size business (SMB) sites.

The sites 130 may include the resources 112. The resources 112 may include any resource that consumes energy distributed by the utility 104 or generates energy that may be distributed to the distribution system 100. Additionally or alternatively, the resources 112 may control operation of a resource that consumes energy or generates energy. For example, a resource may include a switch, a thermostat, controller, electrical breaker, etc. that controls operation of one or more of the resources 112. Some examples of the resources 112 include an electric vehicle (EV), a photovoltaic panel (PV), an air conditioner (AC), a thermostat, a switch, a pool heater, a water heater, a ventilation unit, a thermostatically controlled unit, a fan, a household appliance, a fuel cell, a controller for a piece of equipment, a smart appliance, a piece of commercial or industrial equipment, a clothes dryer, a freezer, a refrigerator, a heater, ventilation, and air conditioner (HVAC) system, a battery charger, a wind generator, other appliances, and other pieces of equipment that consume, produce, or control consumption or production of energy.

The resources 112 may include a balance event module 110. The balance event module 110 may be configured to receive a command signal via the network 122. Based on the command signal, an operational state of the resource 112 or a device controlled by the resource 112 may be altered or maintained. In addition, the balance event module 110 may communicate information to a balance event controller module (controller module) 108 via the network 122. For example, a status signal and/or a receipt confirmation may be communicated from the balance event module 110 to the controller module 108.

In some embodiments, the balance event module 110 may include routines configured to respond to signals sent in a DLC program. In a DLC program, an event controller server (controller server) 106 may directly control state transitions of one or more of the resources 112. In other embodiments, the balance event module 110 may be configured to implement other types of DR programs.

The balance event module 110 may be implemented using hardware including a processor, a microprocessor (e.g., to perform or control performance of one or more operations), a field-programmable gate array (FPGA), or an application-specific integrated circuit (ASIC). In some other instances, the balance event module 110 may be implemented using a combination of hardware and software. Implementation in software may include rapid activation and deactivation of one or more transistors or transistor elements such as may be included in hardware of a computing system (e.g., the resource 112). Additionally, software defined instructions may operate on information within transistor elements. Implementation of software instructions may at least temporarily reconfigure electronic pathways and transform computing hardware.

The customers 120 may include individuals, groups of individuals, or other entities. The sites 130 and the resources 112 may be associated with the customers 120. For example, a first customer 120A may be associated with the first site 130A and the first resource 112A and a second customer 120B may be associated with the second site 130B, etc. In some embodiments, the customers 120 may determine whether to participate in micro-balance events and/or under what conditions a micro-balance event may include a particular resource 112. In other embodiments, the customers 120 may agree in advance to participate in or allow energy curtailment or energy productions of the resources 112 in the micro-balance events.

The customers 120 may set a condition of the resources 112 that affects formulation of micro-balance events involving that resource 112. For example, the first resource 112A may include an AC. The first customer 120A may set the AC to maintain a particular temperature deviation from a setpoint of a thermostat (e.g., 2° Fahrenheit). A micro event involving the AC may be constrained by the temperature setting. Another example may include customer preferences (e.g., participation during certain times) and/or deadline constraints (e.g., EV charged by 8:00 AM).

In the embodiment of FIG. 1, a first site 130A, a third site 130C, and a fourth site 130D may be included in a virtual power plant (VPP) 121. The VPP 121 groups the first site 130A, the third site 130C, and the fourth site 130D. Conceptually, the VPP 121 may be viewed as a power plant, which is similar to the utility 104, in the distribution system 100. The VPP 121 may include software control that regulates operation of the sites 130 and/or resources 112 included therein. Using DR signaling (e.g., OpenADR), energy consumption and energy production of the sites 130 and/or resources 112 in the VPP 121 may be controlled.

In some embodiments, selection of the resources 112 to include in the controlled sub-group may be performed on a VPP-basis. For example, only the resources 112 in the VPP 121 may be considered for inclusion in the controlled sub-group and an energy target may be provided for the VPP 121 instead of the entire distribution system 100.

Moreover, in embodiments that include two or more VPPs (e.g., 121), a controlled sub-group may be generated for one or more VPPs. Each of the VPPs may have a particular energy target that pertains thereto. The resources 112 included in the controlled sub-group may be selected from the resources 112 in the VPP 121 based on the energy target particular to the VPP 121.

In the distribution system 100, the utility 104 may distribute energy, which may include electricity, to the sites 130 and the resources 112. The distribution of the energy by the utility 104 to the sites 130 and the resources 112 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set terms for the micro-balance events. For example, the utility 104 may set an incentive, a micro DR duration, a total curtailment, an energy target, and the like.

The DR aggregator 102 may include an entity that acts as an intermediary between the utility 104 and the sites 130 and/or the customers 120. An example of the role as the intermediary may include coordination and implementation of the micro-balance events. For example, the DR aggregator 102 may coordinate the customers 120 such that total curtailment amounts (e.g., an energy target) may be achieved during one or more micro-balance events. In addition, the DR aggregator 102 may identify the sites 130 and/or the customers 120 to include in the distribution system 100. In some embodiments, criteria of the micro-balance events and/or an incentive offered by the utility 104 may be communicated to the DR aggregator 102. The DR aggregator 102 may in turn communicate the criteria to the customers 120 and/or the sites 130 and offer some portion of the incentive to the sites 130 in exchange for participation in the micro-balance events.

The sites 130 and/or the VPP 121 may be managed by the DR aggregator 102. The DR aggregator 102 may coordinate implementation of, or implement via the controller server 106, the micro-balance events by the resources 112 or the VPP 121 it manages. In the depicted embodiment, the DR aggregator 102 may act as an intermediary as described above. In some embodiments, the DR aggregator 102 may be omitted and the utility 104 may directly implement the micro-balance events via the controller server 106.

The controller server 106 may include a hardware server that includes a processor, memory, and communication capabilities. The controller server 106 may be configured to communicate with the resources 130 and/or the sites 130 via the network 122. The controller server 106 may be configured to perform micro-balance event resource selections and/or to implement micro-balance events based thereon.

In the depicted embodiment, the controller server 106 may be associated with the utility 104 and/or the DR aggregator 102. Accordingly, the controller server 106 may perform micro-balance event resource selections under the control of the utility 104 and/or the DR aggregator 102. In some embodiment, the controller server 106 may be associated with a third party (not shown). The third party may perform micro-balance event resource selections at the request of the utility 104 and/or the DR aggregator 102, for instance.

The controller server 106 may include the controller module 108. The controller module 108 may be configured to perform micro-balance event resource selections and implement one or more micro-balance events based thereon. Performance of the micro-balance event resource selections may result in a selection as to which of the resources 112 are included in the controlled sub-group for each of the micro-balance events. The resources 112 included in the controlled sub-group may be based on availability schedules computed for one or more of the resources 112, a sub-group resource capacity of the resources in the controlled sub-group, an energy target, a priority list, some other factors discussed in this disclosure, or some combination thereof.

The controller module 108 may be implemented using hardware including a processor, a microprocessor (e.g., to perform or control performance of one or more operations), a FPGA, or an ASIC. In some other instances, the controller module 108 may be implemented using a combination of hardware and software. Implementation in software may include rapid activation and deactivation of one or more transistors or transistor elements such as may be included in hardware of a computing system (e.g., the controller server 106). Additionally, software defined instructions may operate on information within transistor elements. Implementation of software instructions may at least temporarily reconfigure electronic pathways and transform computing hardware.

In some embodiments, the controller module 108 may be configured to perform micro-balance event resource selections for one or more sub-intervals of an overall duration of a balance event. For example, with reference to FIG. 3, a block diagram of an overall duration 300 for a balance event is depicted. The overall duration 300 may be divided into one or more balance intervals 302. The balance intervals 302 may be further divided into control sub-slots 304. Only one of the control sub-slots 304 is labeled in FIG. 3.

The control sub-slots 304 may represent periods of time during which one or more of the resources 112 are controlled in a particular operational state. For example, during a first control sub-slot 304, the first resource 112A may be in first operational state (e.g., an on state). Between the first control sub-slot 304 and a subsequent control sub-slot 304, a command signal may be communicated to the first resource 112A. The command signal may change the operational state of the first resource 112A from a current operational state to another operational state (e.g., from on-to-off). The command signal may control the operational state of the first resource 112A for a single control sub-slot or may control the operational state of the first resource 112 for multiple control sub-slots.

Figure 2:
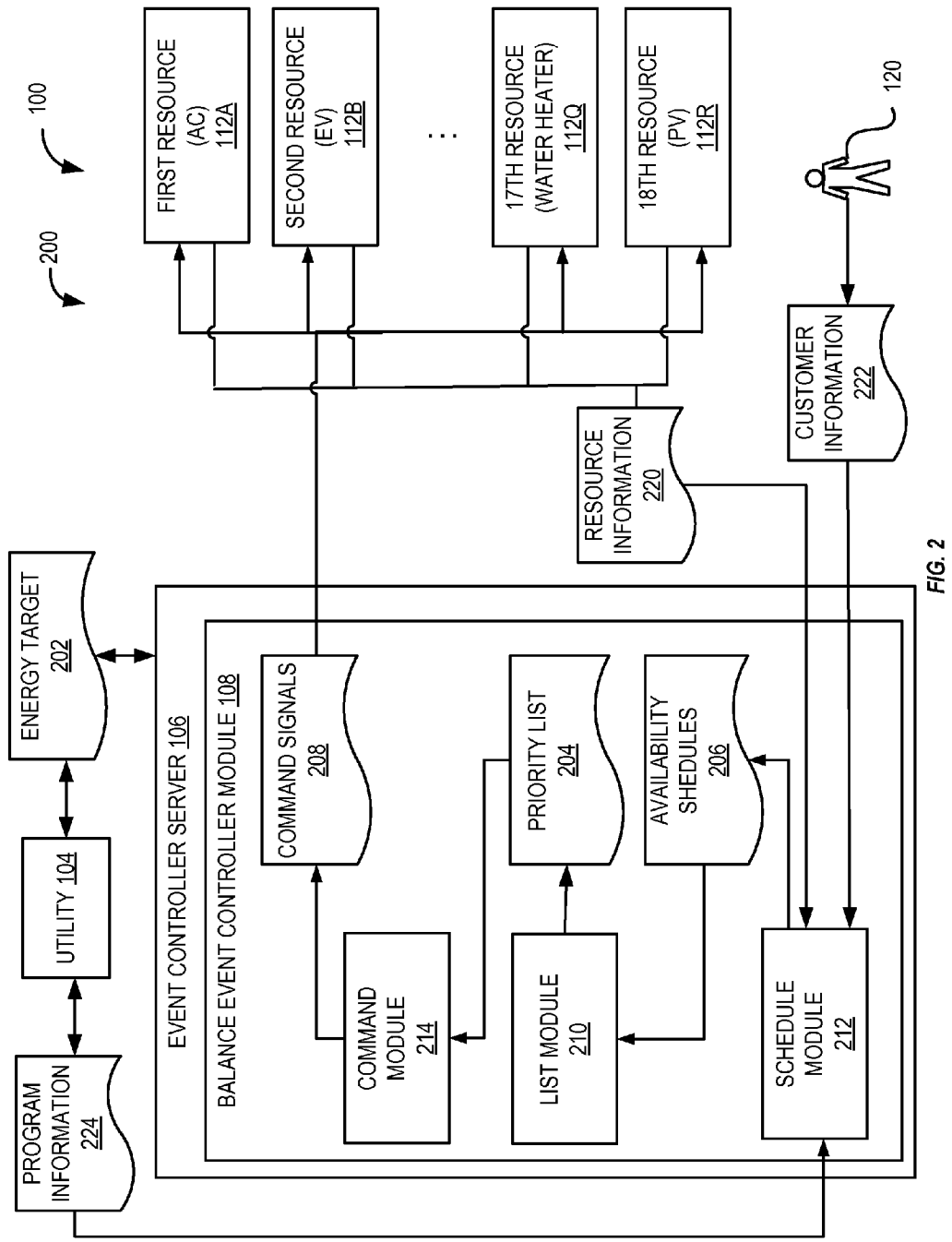
FIG. 2 depicts an example micro-balance event resource selection process that may be implemented in the distribution system of FIG. 1.

Although not shown in FIG. 2, in some distribution systems, one or more of the sites 130 may include a Home Energy Management System (HEMS) (e.g., a physical device or a cloud-based software process). The HEMS may receive command signal from a DR aggregator. The HEMS may communicate the command signals with the resources 112, may be configured to access status of the resource 112 (e.g., current state of charge, setpoint temperature, thermostat schedule, etc.), or may be configured to report specific changes in status of the resource 112.

In this and other embodiments, the overall duration 300 may be 24 hours, each of the balance intervals 302 may be 30-minutes, and the control sub-slots 304 may be 5-minutes. In other embodiments, one or more of the overall duration 300, the balance intervals 302, and the control sub-slots 304 may be another time period.

Referring back to FIG. 1, the controller module 108 may perform a micro-balance event resource selection for one or more control sub-slots of a balance interval. In some embodiments, the controller module 108 may perform a micro-balance event resource selection for one or more of the control sub-slots in the balance interval.

For example, for a current control sub-slot the controller module 108 may compute availability schedules for the resources 112. The availability schedules may be based on one or more constraints. The constraints may include resource constraints such as wear-and-tear constraints and control modes; customer constraints such as comfort constraints, deadline constraints, and detailed preferences; and program constraints such as a number of hours per day one or the resources 112 may be controlled, a number of hours and/or days per year one of the resources 112 may be controlled, a number of degrees by which a customer set point may be deviated, and a cycling percentage for one or more of the resources 112.

The controller module 108 may create a priority list of the resources 112. The priority list may be based on one or more prioritization rules and the availability schedules. The priority list may include the resources 112 organized into an order in which the resources 112 are added to the controlled sub-group. The controller module 108 may calculate a sub-group resource capacity. The sub-group resource capacity includes a sum of resource capacities of a subset of the resources 112 included in the controlled sub-group. The controller module 108 may receive an energy target. The energy target may include an energy amount to be balanced during the energy balance event divided by a number of control sub-slots in the balance interval.

The controller module 108 may determine whether the sub-group resource capacity is greater than or equal to the energy target. In response to a determination that the sub-group resource capacity is less than the energy target, the controller module 108 may add one of the resources 112 that has a first position on the priority list to the controlled sub-group. In addition, in response to the determination that the sub-group resource capacity is less than the energy target, the controller module 108 may calculate an updated sub-group resource capacity. The updated sub-group resource capacity may include the sub-group resource capacity and a resource capacity of the added resource 112.

The controller module 108 may determine whether the updated sub-group resource capacity is greater than or equal to the energy target. In response to a determination that the updated sub-group resource capacity is greater than or equal to the energy target, the controller module 108 may communicate a command signal to the resources 112 in the controlled sub-group that control an operational state of the resources. The controller module 108 may then perform a micro-balance event resource selection for one or more of the control sub-slots of the balance interval.

In the distribution system 100 of FIG. 1, the utility 104 may distribute energy to the sites 130. Accordingly, the micro-balance events described with reference to FIG. 1 may include curtailment or production of electrical energy. In some other embodiments, the utility 104 may provide another resource such as natural gas or water to the sites 130. Thus, in these other embodiments, the micro-balance events may include curtailment or production of other resources.

Modifications, additions, or omissions may be made to the distribution system 100 without departing from the scope of the present disclosure. The present disclosure may apply to distribution systems that may include one or more customers 120, one or more sites 130, one or more resources 112, one or more utilities 104, one or more VPPs 121, one or more DR aggregators 102, one or more controller servers 106, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

FIG. 2 depicts an example micro-balance event resource selection process (process) 200 that may be implemented in the distribution system 100 of FIG. 1. In the embodiment of FIG. 2, the distribution system 100 includes the first resource 112A, the second resource 112B, a seventeenth (17th) resource 112Q, an eighteenth (18th) resource 112R, the customer 120, and the controller server 106. The 17th resource 112Q and the 18th resource 112R are substantially similar to the resources 112 described elsewhere in this disclosure. The network 122 is omitted in FIG. 2, but communications described with reference to FIG. 2 may occur via the network 122 of FIG. 1. Additionally, in FIG. 2, the utility 104 is included and the DR aggregator 102 is omitted. In some embodiments, the process 200 may include the DR aggregator 102 and/or one or more other types of ISOs.

FIG. 2 depicts an example embodiment of the controller module 108. The controller module 108 of FIG. 2 includes a command module 214, a list module 210, and a schedule module 212. One or more of the command module 214, the list module 210, and the schedule module 212 may be implemented using hardware including a processor, a microprocessor (e.g., to perform or control performance of one or more operations), a FPGA, or an ASIC. In some instances, one or more of the command module 214, the list module 210, and the schedule module 212 may be implemented using a combination of hardware and software. Implementation in software may include rapid activation and deactivation of one or more transistors or transistor elements such as may be included in hardware of a computing system (e.g., the controller server 106). Additionally, software defined instructions may operate on information within transistor elements. Implementation of software instructions may at least temporarily reconfigure electronic pathways and transform computing hardware.

In the process 200, an energy target 202 may be communicated to the controller server 106. In the depicted embodiment, the utility 104 may communicate the energy target 202 to the controller server 106. In some embodiments, the energy target 202 may be communicated from a DR aggregator (e.g., the DR aggregator 102 of FIG. 1), another ISO, another entity, or some combination thereof.

The energy target 202 may include an energy amount to be balanced during an energy balance event. The energy target 202 may be quantified relative to a balance interval, a control sub-slot, or any other appropriate period of time. Regardless of the particular form of the energy target 202, it may be modified to enable assessment of a controlled sub-group for a control sub-slot as described in this disclosure. The resources 112 included in a controlled sub-group may be controlled to achieve the energy target 202 or some portion thereof. For example, the energy target 202 may include an energy amount (e.g., 1 MWh) to be curtailed during a DR curtailment event. The energy amount may be divided by a number of balance intervals and/or a number of control sub-slots included in the DR curtailment event to provide a target amount of energy to be curtailed during each of the balance intervals and/or control sub-slots.

The resources 112 included in the controlled sub-group may include a sub-group resource capacity. The sub-group resource capacity may include a sum of curtailment capacities or production capacities of the resources 112 in the controlled sub-group. Inclusion of resources 112 into the controlled sub-group may be based on a relationship between the sub-group resource capacity and the energy target 202 or some portion thereof (e.g., the energy target 202 divided by a number of control sub-slots). Accordingly, the controller server 106 may ensure that energy curtailed or generated during a balance event meets the energy target 202.

The energy target 202 may be communicated at a particular interval. For example, the energy target 202 may be communicated from the utility 104 each day, each hour, or each 5-minute interval based on energy market prices. Additionally or alternatively, the energy target 202 may be continuously communicated or communicated at an unplanned period. For example, the utility 104 may communicate an energy target 202 in response to identification of a market opportunity.

The controller server 106 may receive or access resource information 220 from the resources 112 or another source (not shown). The resource information 220 may include operating characteristics of the resources 112, which may be used as resource constraints of the resources 112. The schedule module 212 of the controller module 108 may compute availability schedules of the resources 112 based at least partially on the resource information 220.

For example, the resource information 220 may include an operating interval of the first resource 112A. The operating interval may include an amount of time the first resource 112A is designed to operate without causing undue wear-and-tear. The schedule module 212 may compute the availability schedule such that the first resource 112A cycles for the operating interval prior to transitioning an operational state of the first resource 112A. Another example of the resource information 220 may include a control mode of the second resource 112B. The control mode may include a charging rate of the second resource 112B. The schedule module 212 may compute one or more availability schedules 206 of the second resource 112B taking into consideration the charging rate.

The controller server 106 may receive or access customer information 222. The customer information 222 may be used to determine customer constraints. The customer constraints may include comfort constraints, deadline constraints, detailed preferences, or some combination thereof. The schedule module 212 of the controller module 108 may compute the availability schedules 206 of the resources 112 based at least partially on the customer information 222. In FIG. 2, the customer information 222 is received or accessed from the customer 120. In some embodiments, the customer information 222 may be derived or accessed from the resources 112 or another entity such as a governmental entity. Moreover, the customer 120 may use a computing device (not shown) to communicate the customer information 222.

The controller server 106 may receive or access program information 224. The program information 224 may be used to determine program constraints of a DR program implemented in the distribution system 100. The program constraints may include a number of hours per day the resources 112 may be controlled, a number of hours and/or days per year the resources 112 may be controlled, a number of degrees by which a customer set point may be deviated, a cycling percentage for one or more of the resources 112, or some combination thereof.

In the embodiment of FIG. 2, the program information 224, the access customer information 222, and the resource information 220 are accessed by the controller server 106. In some embodiments, the controller server 106 or another entity or system may include a learning algorithm. The learning algorithm may be implemented to learn and forecast customer behavior. For example, the learning algorithm may learn and forecast a time the customer 120 gets home, how much of an EV battery will be or is used, a time the customer 120 uses hot water, preferred AC settings, etc.

The schedule module 212 of the controller module 108 may compute the availability schedules 206 of the resources 112 based at least partially on the program information 224. In FIG. 2, the program information 224 is received or accessed from the utility 104. In some embodiments, the program information 224 may be derived or accessed from another entity such as a governmental entity.

The schedule module 212 may compute the availability schedules 206 for one or more of the resources 112. The availability schedules 206 may be based on the program information 224, the resource information 220, the customer information 222, or some combination thereof. The availability schedules 206 may be communicated to the list module 210.

For example, the first resource 112A may include an AC including an off state and an on state in which the AC is cooling. In this example, the availability schedule may be defined according to a thermal model expression:

$$u = a\theta_{in} + b\theta_{out} + c$$

In the thermal model expression, u represents the duty cycle of the first resource 112A. The parameter u may returns a one in response to the first resource 112A being in an on state at a time and that returns a zero in response to the first resource 112A being in an off state at the time. The parameter $\theta_{in}$ represents an indoor air temperature on thermostat at a time. The parameter $\theta_{out}$ represents outdoor temperature at a time. The parameters a, b, and c represent model parameters for the thermal model expression. The model parameters for the thermal model expression may be computed by a linear regression technique. In some embodiments, the thermal model expression may be extended to allow for nonlinear terms in the indoor air temperature and the outdoor temperature (e.g., $\theta_{out}^2$ and $\theta_{in}^2$).

The schedule module 212 may be configured to estimate a baseline cycling percentage. The baseline cycling percentage may include a cycling percentage of the first resource 112A that maintains an indoor temperature at a particular set point. The baseline cycling percentage may be based on a generated duty cycle expression.

In some embodiments, the baseline cycling percentage may be estimated as a difference between one and the generated duty cycle expression in which the value of an indoor temperature parameter of the generated duty cycle expression is equated to the particular set point. For example, the baseline cycling percentage may be calculated according to a baseline cycling percentage expression:

$$\text{BaselineCycling}_i = 1 - (a_i \theta_{set,i} + b_i \theta_{out} + c_i)$$

In the baseline cycling percentage expression, BaselineCycling represents the baseline cycling percentage. The equation $a_i \theta_{set,i} + b_i \theta_{out} + c_i$ represents a duty cycling equation based on the thermal model with $\theta_{in}$ being set to a $\theta_{set,i}$ that represents the particular set point.

The schedule module 212 may be configured to estimate a curtailed cycling percentage. The curtailed cycling percentage may include a cycling percentage that maintains the indoor temperature of a site in which the first resource 112A is included within a particular temperate interval of the particular set point. The curtailed cycling percentage may be estimated as a difference between one and the generated duty cycle expression in which the value of the indoor temperature parameter is equated to a sum of the particular set point and the particular temperate interval. For example, the baseline cycling percentage may be calculated according a curtailed cycling percentage expression:

$$\text{CurtailedCycling}_i = 1 - a1(\theta_{set,i} + \Delta) + b_i \theta_{out} + c_i$$

In the curtailed cycling percentage expression, CurtailedCycling represents the curtailed cycling percentage. The equation $a_i(\theta set,i + \Delta) + b_i \theta_{out} + c_i$ represents a duty cycling expression based on the thermal model with $\theta_{in}$ being set to a $(\theta_{set,i} + A)$, which represents a sum of the particular set point and the particular temperate interval. In embodiments in which the first resource 112A includes a capability to retrieve a current baseline cycling percentage, then the current baseline cycling percentage may be used to compute the curtailed cycling percentage using $\text{CurtailedCycling}_i = \text{BaselineCycling}_i - a_i \Delta$. Based on the thermal model expression, the baseline cycling percentage expression, and the curtailed cycling percentage expression, the schedule module 212 may compute the availability schedule 206 of the first resource 112A.

In some embodiments, the thermal model expression, the baseline cycling percentage expression, and the curtailed cycling percentage expression may be similar to those discussed in U.S. patent application Ser. No. 14/594,008 filed Jan. 9, 2015, which is incorporated herein by reference in its entirety.

In another example, the second resource 112B may include an EV. An availability schedule 206 may be computed for the second resource 112 based on a default charge rate, an uncharged portion (e.g., an amount to be charged to meet a charged state), and a charge deadline. The uncharged portion may be divided by the default rate to determine a total remaining charge time. The total remaining charge time may be divided by a number of minutes in a control sub-slot to determine a number of the control sub-slots the second resource 112B is to be included. The second resource 112B may then be charged during the number of control sub-slots. During the remaining sub-slots before the charge deadline, the second resource 112B may not be charged.

In some embodiments, the availability schedules 206 for one or more of the resources 112 may be computed based on when the resource 112 is available, a curtailment or ramp up schedule, and the constraints discussed elsewhere herein.

For example, FIGS. 4A-4D include tables that represent example availability schedules 400A-400D.

In the availability schedules 400A and 400B, a first availability schedule 400A may be computed for the first resource 112A, which may be an AC. The first resource 112A may be able to be in an off operational state for 50% of the time, but not necessarily with a periodic schedule. A second availability schedule 400B may be for the 18th resource 112R, which may be a PV. The 18th resource 112R may not be available in an initial three control sub-slots 304 and for one hour at a time.

The availability schedules 400A and 400B include indicators (V, X, P1, P2, P3, and P4). The V indicator may denote that the resource 112 is available for control in the control sub-slot 304. The X indicator may denote that the resource 112 is not available for control in the control sub-slot 304. The indicators P1-P4 are referred to as resource control status indicators. In general, the resource control status may denote that if the resource was controlled in a previous control sub-slot 304, the resource 112 may be controlled in a current sub-slot 304.

In addition, each of the resource control status indicators may include additional information pertaining to the resource 112. The P1 indicator may represent a first resource control status. The first resource control status (P1) may denote that the resource 112 with a cycling behavior that has not been turned off a maximum percentage of time allowed, and the resource 112 is to be turned off in the control sub-slot 304 to increase energy balance capacity.

The P2 indicator may represent a second resource control status. The second resource control status may denote that it is desirable to turn off the resource 112 in the control sub-slot 304 to increase program benefits for the utility 104. The P3 indicator may represent a third resource control status. The third resource control status may denote that it is desirable that the resource 112 is controlled again within the next few (e.g., one to three) hours. The P4 indicator may represent a fourth resource control status. The fourth resource control status (P4) may denote that it is desirable that the resource 112 is controlled again within the same day.

In the availability schedules 400C and 400D, a third availability schedule 400C may be computed for the first resource 112A, which may be an AC. The first resource 112A may have a cycling percentage of 50% each hour, which may mean that the first resource 112A may be turned off after 30 minutes of each hour. The control sub-slots 304 may be 5 minutes. In the third availability schedule 400C, the first resource 112A may have been turned off for a first control sub-slot 304. To maximize or increase an amount of curtailment capacity of the first resource 112A, a soft constraint may include the first resource 112A is to be turned off for an additional 25 minutes during an hour, but the 25 minutes may occur at any time during the hour.

A fourth availability schedule 400D may be for a site (e.g., the site 130). A VPP may have a contract with a customer in which the VPP is able to control the site for up to 10 days per year. In the fourth availability schedule 400D, the control sub-slot 304 are 5 minutes. To maximize an amount of curtailment capacity for the site, a soft constraint may be imposed such that resources in the site are turned off as much as possible during a 24-hour period (up to a maximum). Once one of the resources of a site is controlled, it may be preferentially to select the resource for control on the same day.

In some circumstances, a daily control constraint such as that described with reference to FIG. 4D, may be added to a cycling constraint, such as that described with reference to FIG. 4C. Once the cycling constraint for a particular hour is complete, priorities may be assigned for the control slots 304 for remaining portions of a day such that the first resource 112A may be preferentially selected.

The availability schedules 400C and 400D include indicators (U, M, D1, D2, etc.). The U indicator may denote that the resource 112 is available for control in the control sub-slot 304. The U may include a decimal value of 1.01. The M indicator may denote that the resource 112 is mandatory for control in the control sub-slot 304. The M may include a decimal value of zero. The indicators D1, D2, D3, etc. are referred to as resource control status indicators. In general, the resource control status may reflect how desirable it is to control a resource in a control sub-slot 304. The D1, D2, D3, etc. include a decimal value between zero and one.

Referring to FIG. 4C, when an initial off time of the first resource 112 is scheduled during a particular hour, the following eleven control sub-slots 304 are marked with resource control status (e.g., D1, D2, D3, etc.), which may indicate that it may be desirable to control the first resource 112A. The resource control status of the control sub-slots 304 include a decimal value between zero and one, which increases towards the end of the hour. For example, the first control sub-slot 304, which is labeled "1" is marked with a mandatory "M" indicator and a corresponding "0" decimal value. The next eleven control sub-slots 304, which are labeled 2-12 have decreasing resource control status and a corresponding decreasing decimal values, which are quantified as a fraction of the total number of control sub-slots.

With reference to FIG. 4D, the fourth availability schedule 400D is for 9 hours (e.g., between 3:00 pm and midnight), with twelve 5-minute control sub-slots. Accordingly, the fourth availability schedule 400D includes 109 control sub-slots 304. Each of the control sub-slots 304 may be assigned with resource control status (e.g., D1, D2, D3, etc.) with a corresponding decimal value. The decimal values decrease over time, e.g., 108*(1/109), then 107*(1/109), etc.

In the third availability schedule 400C and the fourth availability schedule 400D, as an end of the day is approached, a priority of using one or more resources of the site and/or the first resource 112A increases. Once the first resource 112A is selected during another hour (e.g., as in FIG. 4C), a cycling constraints may be recomputed for the rest of the day as illustrated in the third availability schedule 400C. In some embodiments, the constraints may be computed at different intervals. For example, the cycling constraint may be computed for the hour, while some other program constraints may be recomputed once the hour is up (e.g., during the hour in which the cycling constraint is observed).

With reference to FIGS. 2 and 4A-4D, in some embodiments, the schedule module 212 may look one control sub-slot 304 ahead and apply one or more of the constraints on an ongoing basis. Accordingly, one or more remaining control sub-slots 304 may be determined during the immediately prior control sub-slot 304.

Referring back to FIG. 2, the list module 210 may be configured to create a priority list 204 of the resources 112. The priority list 204 may be based on one or more prioritization rules and the availability schedules 206. The priority list 204 may include the resources 112 organized into an order in which the resources 112 may be included in a controlled sub-group.

The prioritization rules may result in the order of the resources 112 in the priority list 204. The prioritization rules may be used to place an emphasis on a particular characteristic above another characteristic. The prioritization rules may be based on resource types, the location of the resources, the resource constraints, the customer constraints, the program constraints, or some combination thereof, which may be included in the program information 224, the resource information 220, and the customer information 222. The prioritization rules may be static or may be modifiable.

Some example prioritization rules may include: sorting the resources 112 by a resource control status (e.g., P1-P4 described above); a particular sorting of one or more resource control statuses; sorting the resources 112 based on the resource capacity (e.g., energy curtailment or energy production capacity); sorting the resources 112 such that the resources 112 having larger resource capacities are prior to (e.g., higher on the priority list 204) the resources 112 having smaller resource capacities; sorting the resources 112 based on a time in which a currently available interval of the resource 112 ends; sorting the resources 112 such that the resources 112 with earlier-ending available intervals are prior to the resources 112 with later-ending available intervals; arranging resources 112 based on a number of event participations of the resources 112; and arranging resources 112 such that the resources 112 that have participated in fewer balance events are prior to the resources 112 that have participated in more balance events. In some embodiments, other prioritization rules may be used to create the priority list 204, which may be based on other constraints.

FIGS. 5A-5D illustrate a raw data table 500 and example priority lists 501A-501C. The priority lists 501A-501C may be based on data in the raw data table 500 and prioritization rules. The raw data table 500 and the priority lists 501A-501C may include information pertaining to resources (e.g., the resources 112). The information may include an addition order 502, a control status 504, an availability interval end time (end time) 506, a previous participation 508, a capacity 510, a resource identifier (id) 512, a resource type 514, other information, or any combination thereof.

In FIG. 5A, the addition order 502 is to be determined (TBD). In each of the priority lists 501A-501C, a number is included in the addition order 502. The number corresponds to an order in which the resource 112 is added to a controlled sub-group. The control status 504 includes the resource control status indicators (P1-P4). The end time 506 includes various times (T1-T4). The times (T1-T4) may be times in which a currently available interval ends for the resources. The previous participation 508 may include a number of event participations (N1-N4). The capacity 510 may include an energy amount (C1-C4) that the resource is able to generate or curtail. The resource id 512 are numbers assigned to the resources as identifiers. The resource type 514 may include AC, PV, EV, or water heater. The data in FIGS. 5A-5D is example data for illustrative purposes. In other embodiments, other resource types 514, other times, other energy amounts, other number of event participations, etc. may be included.

With reference to FIG. 5A, the data in the raw data table 500 is not sorted. The raw data table 500 may include information included in the resource information 220, the customer information 222, the program information 224, the availability schedules 206, other information, or some combination thereof.

With combined reference to FIGS. 2 and 5B, the list module 210 may create the first priority list 501A. The list module 210 may sort the resources 112 by a resource control status listed in the control status 504. The resource control status may denote a control status of the resources 112 in the control sub-slot. The resource control statuses in the control status 504 include the first resource control status (P1), the second resource control status (P2), the third resource control status (P3) and the fourth resource control status (P4), which are described above. The resources 112 may be sorted such that the resources 112 with the first resource control status (P1) are prior to the resources 112 with the second resource control status (P2). In addition, the resources 112 may be sorted such that the resources 112 with the second resource control status (P2) are prior to the resources 112 with the third resource control status (P3) and the resources 112 with the third resource control status (P3) are prior to the resources 112 with the fourth resource control status (P4).

The list module 210 may arrange the sorted resources 112 based on the end time 506. In the depicted embodiment, the resources 112 may be sorted such that the resources 112 with earlier-ending available intervals are prior to the resources 112 with later-ending available intervals. The list module 210 may then organize the arranged resources 112 based on a number of event participations of the resources 112. The arranged resources 112 may be organized such that the resources 112 that have participated in fewer balance events are prior to the resources 112 that have participated in more balance events.

In some embodiments, among resources 112 with comparable event participations, the list module 210 may further sort the resources 112 based on the capacity 510. For example, the resources 112 with comparable event participations may be sorted such that the resources 112 having larger resource capacities are prior to the resources 112 having smaller resource capacities. In some embodiments, comparable event participations may include the resources 112 that event participations that are with ten percent of one another. Additionally or alternatively, a number of participations may be rounded up to the nearest 10 or 100. For example, six participations may be considered to be the same as nine participations because these numbers of participations are similar/comparable.

Referring to FIGS. 2 and 5C, the list module 210 may create the second priority list 501B. The second priority list 501B includes the resources 112 sorted according to the resource type 514. Referring to FIGS. 2 and 5D, the list module 210 may create the third priority list 501C. The third priority list 501C includes the resources 112 sorted according to the resource type 514. Following sorting the resources 112 according to the resource type 514, the resources 112 may be sorted by the control status 504, the end time 506, the previous participation 508, or some combination thereof. FIGS. 5B-5C represent examples of priority lists 501A-501C. Other priority lists may be created based on other prioritization rules.

FIGS. 6A-6H illustrate a second raw data table 600, example intermediate lists 601A, 601B, 601D, 601E, and 601F and priority lists 601C and 601G (collectively lists 601). The lists 601 may be based on data in the second raw data table 600 and one or more prioritization rules, some of which are described elsewhere in this disclosure. The second raw data table 600 and the lists 601 may include information pertaining to resources (e.g., the resources 112). The information may include an addition order 602, a control status 604, an availability interval end time (end time) 606, a decimal value 605, a cluster 607, a previous participation 608, a cost or incentive 609, a capacity 610, a resource identifier (id) 612, a resource type 614, other information, or any combination thereof.

In FIG. 6A, the addition order 602 is to be determined (TBD) and the intermediate lists 601A, 601B, 601D, 601E, and 601F. In each of the priority lists 601C and 601G, a number is included in the addition order 602. The number corresponds to an order in which the resource 112 is added to a controlled sub-group. The control status 604 includes the resource control status indicators (M, U, D1, D2, and D3). The decimal value 605 includes a computed priority that relates to the status indicators. The cluster 607 is a resource cluster into which the resources in the second raw data table 600 are included. The end time 606 include various times (T1-T4). The times (T1-T4) may be times in which a currently available interval ends for the resources. The previous participation 608 may include a number of event participations (N1-N4). The cost or incentive 609 includes a cost imposed on a utility and/or an incentive provided to a customer (e.g., the customer 120). The capacity 610 may include an energy amount (C1-C4) that the resource is able to generate or curtail. The resource id 612 are numbers assigned to the resources as identifiers. The resource type 614 may include AC, PV, EV, or water heater. The data in FIGS. 6A-6D is example data for illustrative purposes. In other embodiments, other resource types 614, other times, other energy amounts, other number of event participations, etc. may be included.

With reference to FIG. 6A, the data in the second raw data table 600 is not sorted. The raw data table 600 may include information that is included in the resource information 220, the customer information 222, the program information 224, the availability schedules 206, other information, or some combination thereof. In the second raw data table 600, the decimal value 605 may be calculated for the control statuses 604. As described with reference to FIGS. 4C and 4D, the control status 604 "U," which may correspond to unavailable, may be set to a decimal value of 1.01, the control status 604 "M," which may correspond to mandatory, may be set to a decimal value 605 of zero. The control statuses 604 "D1," "D2," and "D3" may be somewhere between mandatory and unavailable. In the second raw data table 600, a decimal value 605 for "D1" is set to 0.8, a decimal value 605 for "D2" is set to 0.5, and a decimal value 605 for "D3" is set to 0.25. In some embodiments, the control statuses may include different decimal values 605.

With combined reference to FIGS. 2 and 6B, the list module 210 may create a first intermediate list 601A. The list module 210 may cluster the resources 112 based on the decimal values 605. In some other embodiments, the resources 112 may be clustered by the end time 606, the previous participation 608, the cost or incentive 609, the capacity 610, or some combination thereof. For example, in the first intermediate list 601A, the clusters 607 are assigned to subsets of the resources 112 based on the decimal values 605.

With combined reference to FIGS. 2 and 6C, the list module 210 may create a second intermediate list 601B. The list module 210 may randomize the resources 112 in each of the clusters 607. For example, in the first intermediate list 601A and in the second intermediate list 601B include resources 112 with reference id 612 of "2," "5," "8," "12," and "16". In the first intermediate list 601A an order is "2," then "5," then "8," then "12," and then "16." In the second intermediate list 601B in which the resources 112 have been randomized, an order is "5," then "16," then "8," then "12," and then "2."

With combined reference to FIGS. 2 and 6D, the list module 210 may create a fourth priority list 601C. The list module 210 may re-order the list per cluster based on one or more of the other constraints in the second raw data list 600. For example, in the fourth priority list 601C includes the resources 112 in each of the clusters 607 according to the previous participation 608, then the cost or incentive 609, and then the capacity 610. In the fourth priority list 601C, the resources 112 are re-ordered within the clusters 607.

The fourth priority list 601C may be created based on a selection of a priority of performance. For example, the fourth priority list 601C may be created to prioritize performance of a VPP that includes one or more of the resources 112. In contrast, a fifth priority list 601G may be created based on a selection to prioritize cost reduction or minimization above performance.

With combined reference to FIGS. 2 and 6E, the list module 210 may create a third intermediate list 601D. The list module 210 may cluster the resources based on the cost or incentive 609. In the third intermediate list 601D, the clusters 607 are based on a cost/incentive range of about $1.00. In other embodiments, other ranges may be used to create the clusters.

With combined reference to FIGS. 2 and 6F, the list module 210 may create a fourth intermediate list 601E. In the fourth intermediate list 601E, the clusters 607 may be sorted based on the decimal value 605 in each of the clusters 607 formed based on the cost or incentive 609.

With combined reference to FIGS. 2 and 6G, the list module 210 may create a fifth intermediate list 601F. The list module 210 may further cluster the resources 112 in the each of the clusters 607 formed based on the cost or incentive 609. The further clustering may be based on the decimal values 605. In the fifth intermediate list 601F, the clusters 607 are listed as a decimal (e.g., 1.1, 1.2, 2.1, 2.2, 3.1, and 3.2). The first digit of the decimal indicates a cluster formed based on the cost or incentive 609. The second digit of the decimal indicates a cluster formed based on the decimal value 605. Thus, a cluster 607 of a resource 112 that is 3.2 indicates that when clustered according to the cost or incentive 609, the resource 112 is clustered into a cluster labeled "3" and when clustered according to the decimal value 605, the resource is clustered into a cluster labeled "2."

With combined reference to FIGS. 2 and 6H, the list module 210 may create the fifth priority list 601G. The list module 210 may randomize the resources 112 in each of the clusters 607. In addition, the list module 210 may reorder the list per cluster based on one or more additional constraints. In the fifth priority list 601G, the resources 112 are randomized within the clusters 607, and then sorted by previous participation 608 and capacity 610.

Referring back to FIG. 2, the priority lists 204 may be communicated to the command module 214. The command module 214 may determine which of the resources 112 are included in the controlled sub-group. The command module 214 may communicate command signals 208 to the resources 112 that are included in the controlled sub-group. The command signals 208 may affect the operational state of the resources 208.

Which of the resources 112 are included in the controlled sub-group may be based on the energy target 202 and the sub-group resource capacity. The command module 214 may calculate the sub-group resource capacity. The sub-group resource capacity may include a sum of resource capacities of a subset of the resources 112 that are included in the controlled sub-group. The command module 214 may determine whether the sub-group resource capacity is greater than or equal to the energy target 202. In response to a determination that the sub-group resource capacity is less than the energy target 202, the command module 214 may add one of the resources 112 that has a first position on the priority list 204, and not included already in the controlled sub-group, to the controlled sub-group.

For example, with reference to FIGS. 2 and 5B, a controlled sub-group may include resources 112 with resource id 512 of 1, 6, and 4. The sub-group resource capacity may be calculated as C1+C2+C1. In response to the sub-group resource capacity being less than the energy target 202, the command module 214 may add the resource with the resource id 512 of 3 to the sub-group resource capacity.

The command module 214 may calculate an updated sub-group resource capacity that includes the sub-group resource capacity (e.g., C1+C2+C3) and a resource capacity (C2) of the added resource (e.g., C1+C2+C1+C2). The command module 214 may determine whether the updated sub-group resource capacity is greater than or equal to the energy target 202. In response to a determination that the updated sub-group resource capacity is greater than or equal to the energy target 202, the command module 214 may communicate the command signal 208 to the resources 112 in the controlled sub-group. For instance, the command module 214 may communicate the command signal 208 to the resources 112 having the resource id 512 of 1, 6, 4, and 3.

Referring to FIG. 2, the command module 214 may update a resource control status of the resources 112 in the controlled sub-group. The command module 214 may update the resource control status of the resources 112 in the controlled sub-group, which may affect a priority list 204 of a next control sub-slot.

For example for thermal resources such as an AC, if the resource 112 has been controlled less than its cycling off percentage over the last 60 minutes, the AC may be updated with a resource control status of P1 for a next control sub-slot. The resource control status P1 may affect a priority list 204 for the next control sub-slot. Additionally or alternatively, in an availability schedule 206 a next control sub-slot may be updated with a resource control status if the resource 112 was curtailed during a current sub-slot, is available during a next control sub-slot, and includes location curtailment constraints.

In some embodiments, to avoid snapback when control of a thermal resource (e.g., an AC) is released, the resource 112 may be returned to an original cycling schedule and maintain the resource 112 until a pre-event set point is reached. A command signal 208 may be communicated to the thermal resources to return the thermal resource to an original cycling schedule.

The command module 214 may update a number of event participations of the resources 112 in the controlled sub-group. The number of event participations may be included affect subsequent priority lists 204. Following the update, subsequent availability schedules 206 may be computed, subsequent priority lists 204 may be created, and subsequent command signals 208 may be communicated to the resources 112.

In some embodiments, an advanced resource selection may be implemented. The advanced resource selection may be configured to bridge one or more gaps between a forecasted load and/or generation, which may be submitted in advance (e.g., hour-ahead), and a most recent forecast (e.g., 30 minutes or less before the balance event), which may be based on actual load data or actual generation data. For example, actual load data and/or actual generation data may be collected from a HEMS and/or smart meter. A previously computed resource selection may be adapted based on the actual generation data and/or load data to bridge one or more gaps.

Adaptation of the resource selection may include engaging additional resources and/or cancelling previous control commands. For instance, additional resources 112 may be engaged in balance events in response to a load or generation reduction being larger than anticipated. To engage one or more additional resources 112, one or more of the resource 112 may be included in the controlled sub-group as described elsewhere herein.

In circumstances in which one or more additional resources 112 are engaged, constraints and order in the priority list 204 may be preserved. For example, because the energy target 202 may be the same for a current control sub-slot (e.g., the control sub-slot under consideration) and one or more subsequent control sub-slots, a resource 112 added in the current control sub-slot, will likely be selected for inclusion in controlled sub-group in the immediately subsequent control sub-slot if it has a P1 designation. The likelihood of inclusion is because a gap in the current control sub-slot likely exists in the immediately subsequent control sub-slot.

Control commands may be canceled in response to load or generation reduction is smaller than anticipated. Canceling the control commands may include removing resources from the controlled sub-group starting from a most recently added resource 112 proceeding towards earlier added resources 112. The resources 112 may be removed until a difference in load and/or generation is achieved.

In some embodiments, the resources 112 that include a control status of P1 may be skipped. Skipping the resources 112 with the control status of P1 may ensure that the resources 112 with the lowest priority are removed from participation, which may preserve one or more prioritization goals.

In some embodiments, a previously computed resource selection may be adapted based on an updated energy target. The updated energy target may include the energy target 202 modified by actual loads and/or actual generation amounts. For example, the updated energy target may be based on load deviation that may be calculated from actual load data and/or actual generation data. The updated energy target may be used to determine an adapted resource selection.

In some embodiments, an updated energy target for control sub-slots starting with a third control sub-slot in a balance interval (e.g., 302 of FIG. 3) that includes six control sub-slots (e.g., 304 of FIG. 3) may be calculated according to updated energy target expressions:

$$LoadDeviation_S = ET_S - \text{Load};$$

$$UET_S = \frac{ET_S + LoadDeviation_S + LoadDeviation_{S-2}}{6 - S}$$

In the updated energy target expressions, a parameter S represents number assigned to control sub-slot for which the updated energy target is being evaluated. The parameter $UET_S$ represents the updated energy target for a control sub-slot, which is represented by the parameter S. The parameter $LoadDeviation_S$ represents the load deviation for the control sub-slot S. The parameter $ET_S$ represents a previous energy target for the control sub-slot S (e.g., the energy target 202 or some derivative thereof). The parameter Load represents the actual load data (or actual generation data) up to the control sub-slot being for which the updated energy target is being evaluated.

In the updated energy target expressions, the load deviation is applied to all subsequent control sub-slots and the deviation determined from the actual load data is spread amongst the remaining control sub-slots in the balancing interval.

For example, a balance event may begin at a time labeled by 'T'. Each control sub-slot may be five minutes. At time (T) and at a time (T+5) actual load data may be received from the HEMS device at one or more of the resources 112 or the sites 130. The actual load data may constitute the parameter Load in the updated energy target expressions.

At time (T+10) (e.g., 10 minutes after T), the resource selection and scheduling may be modified for subsequent control sub-slots corresponding to times (T+10), (T+15), (T+20), etc. based on an updated energy target calculated based on the energy target 202, a number of remaining control sub-slots (e.g., 6-S) in the updated energy target expressions, and the actual load data. Any modifications or adaptations to the resource selection may result in additional control commands being communicated to affected resources 112.

Figure 7:
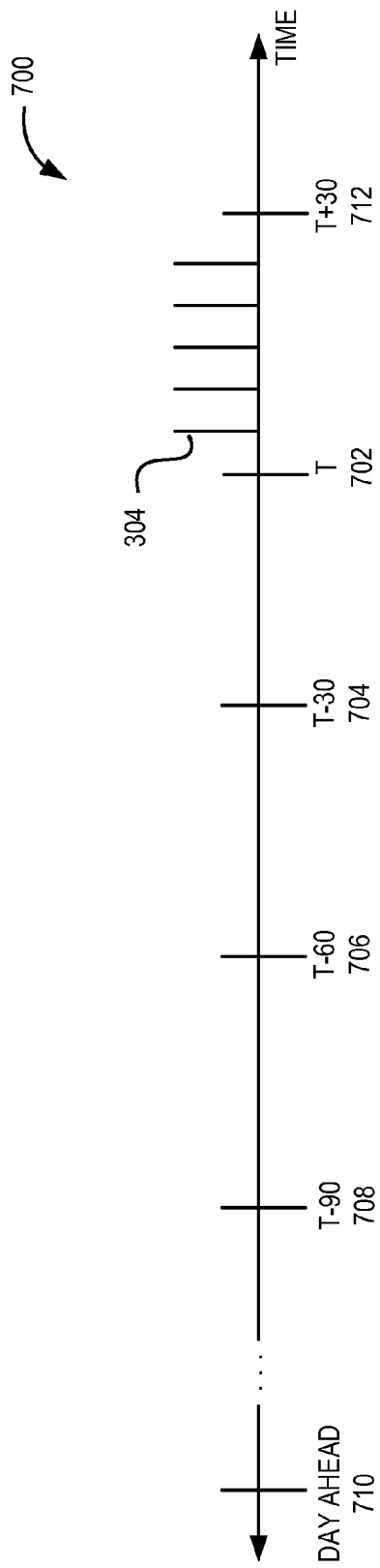
FIG. 7 illustrates an example selection timeline for execution of a balance event that may be implemented in the distribution system of FIG. 1.

FIG. 7 illustrates an example selection timeline 700 for execution of a balance event that may be implemented in the distribution system 100. The selection timeline 700 may be based around a start time 702, which is labeled 'T' in FIG. 7. The start time 702 includes a time in which the balance event begins. Other times 704, 706, 708, 710, and 712 are defined relative to the start time 702. For example, time 704 is labeled T−30, which indicates a time that is 30 minutes prior to the start time 702. Times 706, 708, and 712 are labeled according to a similar convention. Time 710 is representative of a time that is one day ahead of the start time 702.

At time 710, a demand and supply plan may be submitted. The demand and supply plan may include a forecasted demand and supply for a distribution system (e.g., the distribution system 100 of FIG. 1), a VPP (e.g., the VPP 121), one or more sites (e.g., the site 130), or some combination thereof. For example, the demand and supply plan may be submitted for every half an hour for a next day (e.g., the day that includes the start time 702) starting at midnight.

At time 708 (T−90), demand and supply plans may be re-computed. In addition, at the time 708, it may be decided whether to implement a revised demand and supply plan or to implement the demand and supply plan that is submitted at the time 710. Such decision may be based, for example, on a cost of using VPP services versus buying energy in hour-ahead markets. At time 708, based on the demand and supply plan that is decided upon, a tentative resource selection may be computed to bridge gap between forecasts at the time 710 and at the time 708.

At time 706 (T−60), revised demand and supply plans may be submitted. For example, if it is decided to implement the revised demand and supply plan of the time 708 instead of the demand and supply plan of the time 710, it may be submitted.

At time 704 (T−30), demand and supply forecasts for the time 702 (T) to a time 712 (T+30) may be received. Based on the received demand and supply forecasts, a resource selection may be computed and corresponding command signals may be sent and/or scheduled for one or more resources. For example, initial VPP control commands may be computed that complement the received forecasts such that the hour-ahead demand and supply plans for one or more control sub-slots 304 between the start time 702 (T) and the time 712 (T+30) may be achieved.

From the start time 702 until to the time 712 (T+30), based on 5-minute actual load data and 5-minute actual generation data, the resource selection may be adapted every five minutes to reduce or minimize deviation from the implemented demand and supply plan.

Figure 8A:
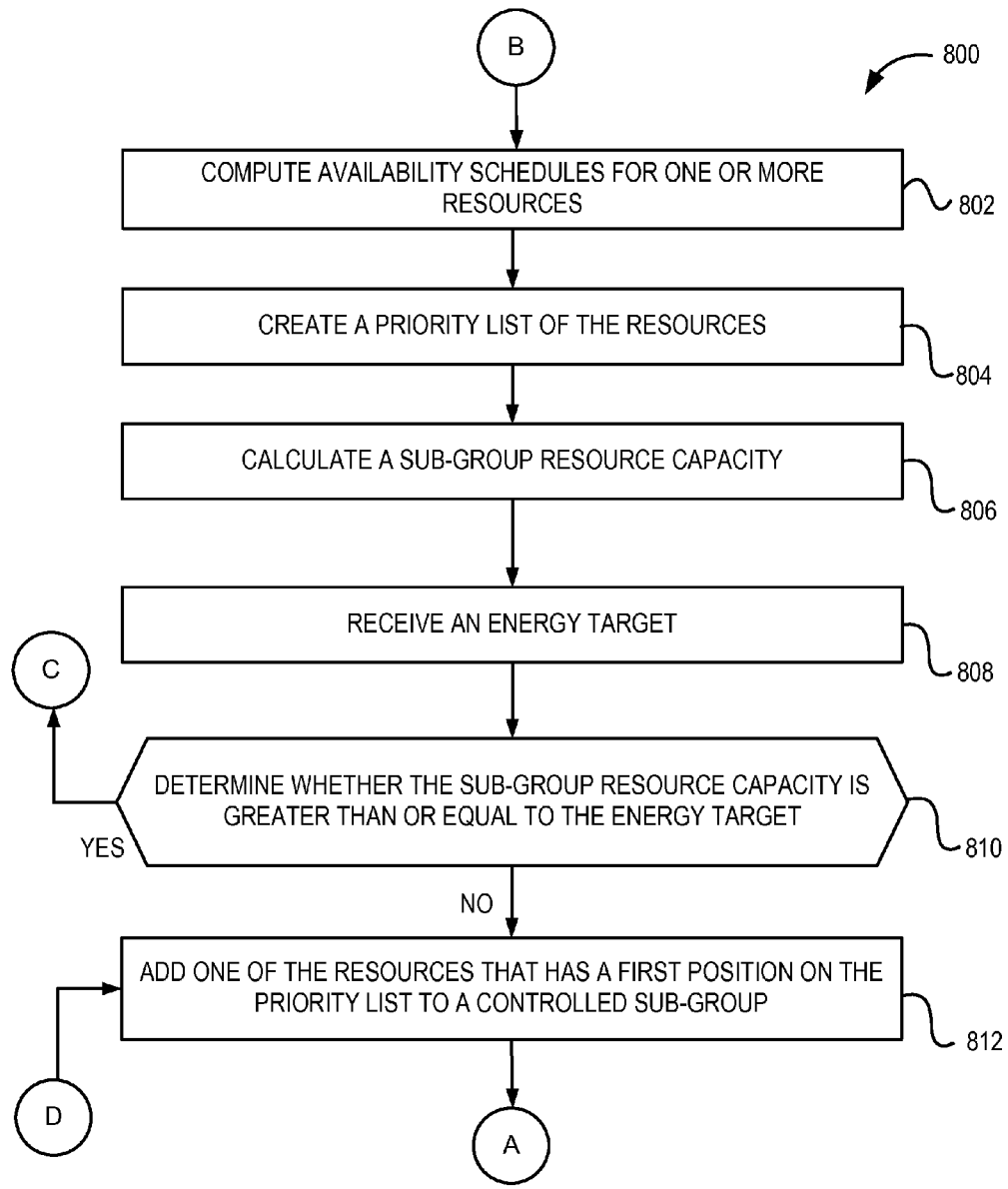
FIGS. 8A-8C are a flow diagram of an example method of resource selection for a micro-balance event.
Figure 8B:
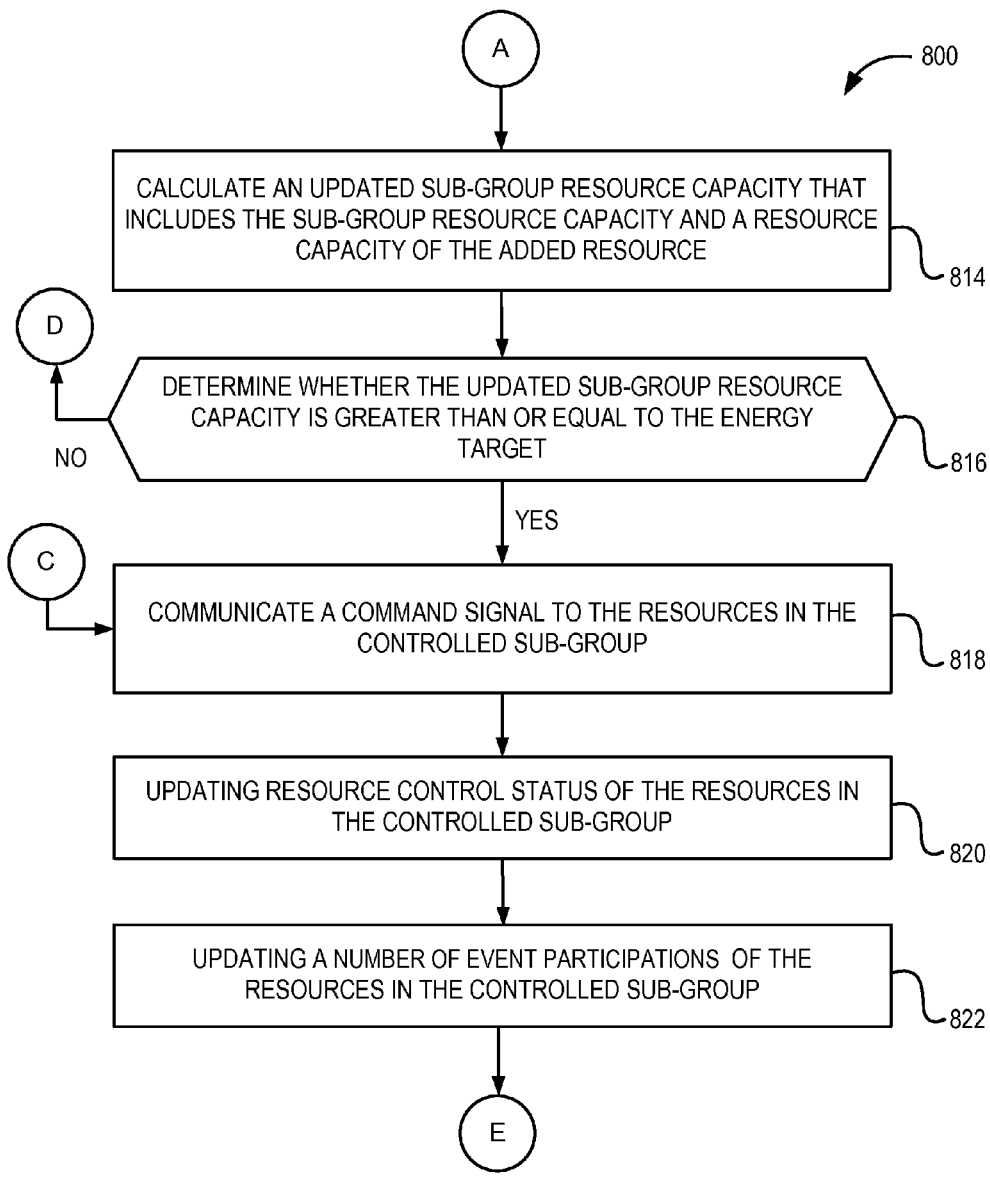
Figure 8C:
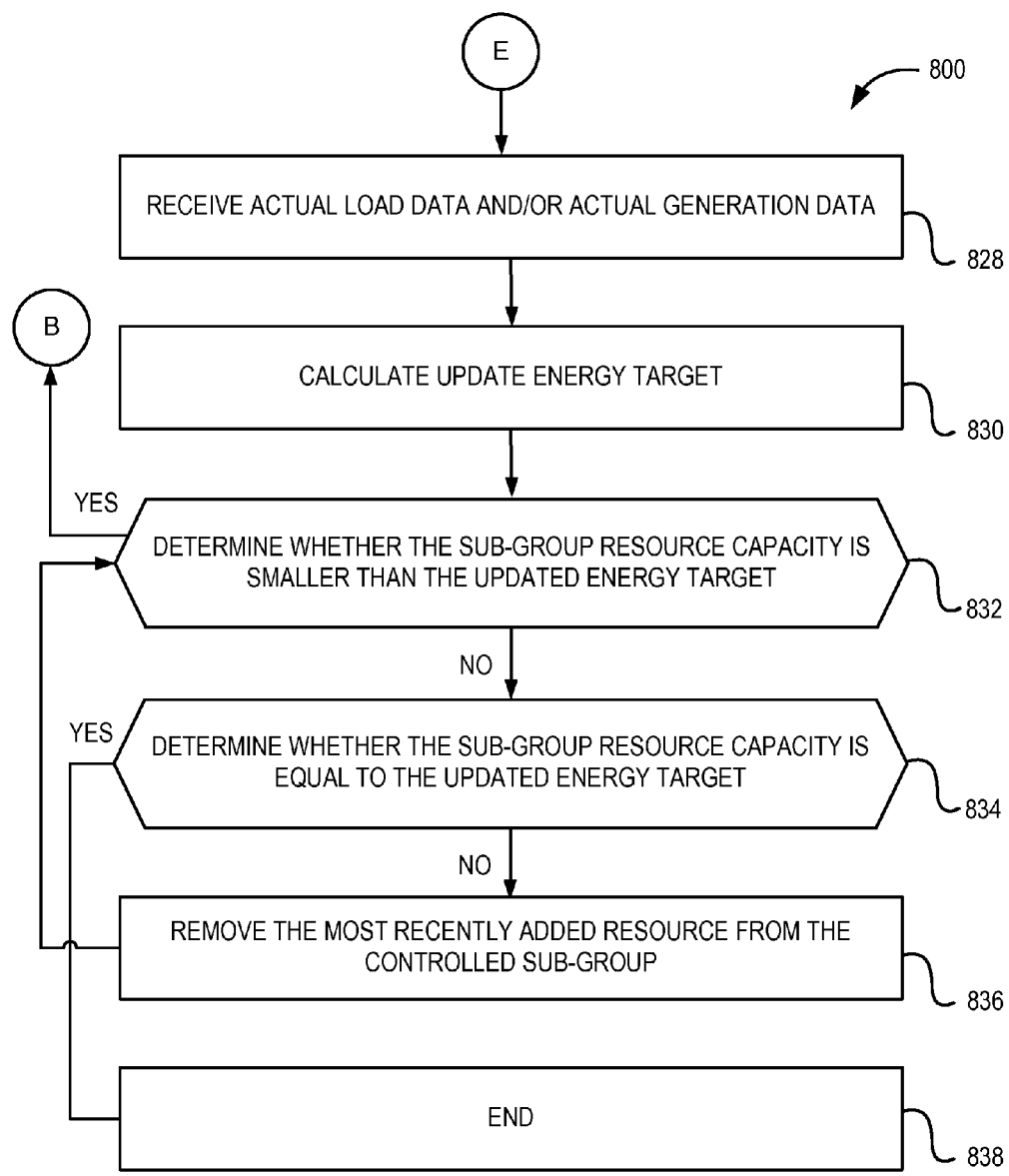

FIGS. 8A-8C are a flow diagram of an example method 800 of resource selection for a micro-balance event, arranged in accordance with at least one embodiment described herein. The method 800 may be performed in a distribution system such as the distribution system 100 of FIG. 1 in which the utility 104 provides energy to the sites 130. Similar methods may be implemented with necessary modifications in systems in which other resources are provided by the utility 104. The method 800 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 1108 of FIG. 11) having stored thereon programming code or instructions that are executable by one or more processors (such as the processor 1104 of FIG. 11) to cause a computing system and/or the controller server 106 to perform or control performance of the method 800. Additionally or alternatively, the controller server 106 may include the processor 1104 described above that is configured to execute computer instructions to cause the controller server 106 or another computing system to perform or control performance of the method 800. Although illustrated as discrete blocks, various blocks may be divided into additional blocks, combined into fewer blocks, or eliminated, depending on the desired implementation.

With reference to FIG. 8A, the method 800 may begin at block 802. At block 802, availability schedules may be computed for one or more resources. In some embodiments, resources may include one or more or a combination of an AC, a PV, and an EV that are included in a VPP. At block 804, a priority list of the resources may be created. The priority list may be based on one or more prioritization rules and the availability schedules. The priority list may include the resources organized into an order in which the resources are added to a controlled sub-group that are activated during the micro-balance event or some portion thereof. In some embodiments, the resources may include a resource type and the priority list may be created, at least partially, by sorting the resources by the resource type. For example, the resources of a first resource type may be prioritized above the resources of a second resource type.

At block 806, a sub-group resource capacity may be calculated. The sub-group resource capacity may include a sum of resource capacities of a subset of the resources included in the controlled sub-group. At block 808, an energy target may be received. The energy target may include an energy amount to be balanced during the micro-balance event or a macro balance event that include multiple micro-balance events. For example, the macro balance event may take place during an overall duration. The overall duration may be divided into one or more balance intervals, which may be further divided into one or more control sub-slots. The energy target may be for one or more of the control sub-slots, one or more of the balance intervals, or for the overall duration. The energy target may be modified such that a controlled sub-group for a control sub-slot may be assessed.

At block 810, it may be determined whether the sub-group resource capacity is greater than or equal to the energy target. For example, it may be determined whether the sub-group resource capacity is greater than or equal to the energy target. In response to a determination that the sub-group resource capacity is less than the energy target ("NO"

at block 810), the method 800 may proceed to block 812. In response to a determination that the sub-group resource capacity is greater than or equal to the energy target ("YES" at block 810), the method 800 may proceed to block 818 of FIG. 8B.

At block 812, one of the resources that has a first position on the priority list may be added to the controlled sub-group. With reference to FIG. 8B, at block 814 an updated sub-group resource capacity may be calculated. The updated sub-group resource capacity may include the sub-group resource capacity and a resource capacity of the added resource.

At block 816, it may be determined whether the updated sub-group resource capacity is greater than or equal to the energy target. In response to a determination that the updated sub-group resource capacity is greater than or equal to the energy target ("YES" at block 816), the method 800 may proceed to block 818. In response to a determination that the updated sub-group resource capacity is less than the energy target ("NO" at block 816), the method 800 may proceed to block 812.

At block 818, a command signal may be communicated to the resources in the controlled sub-group. The command signal may be configured to control an operational state of the resources. At block 820, resource control status may be updated. For example, the resource control status of a next control sub-slot of the resources in the controlled sub-group may be updated. At block 822, a number of event participations may be updated. For example, the number of event participations of the resources in the controlled sub-group may be updated.

With reference to FIG. 8C, after block 822, the method 800 may proceed to block 828. At block 828 an actual load data and/or actual generation data may be received. For example, the actual load data and/or the actual generation data may be received from one or more sites via a HEMS or smart meter. At block 830, an updated energy target may be calculated. The updated energy target may be based on the received load data and/or generation data and a remaining number of control sub-slots.

At block 832, it may be determined whether the sub-group resource capacity is smaller than the updated energy target. In response to the sub-group resource capacity not being smaller than the updated energy target ("NO" at block 832), the method 800 may proceed to block 834. In response to the sub-group resource capacity being smaller than the updated energy target ("YES" at block 832), the method 800 may proceed to block 802 and one or more of blocks 802, 804, 806, 808, 810, 812, 814, 816, 818, 820, and 822.

For example, for the next control sub-slot of the balance interval, a subsequent priority list of the resources may be created as described with reference to block 804. The subsequent priority list may be based on the prioritization rules. A subsequent sub-group resource capacity may be calculated as described with reference to block 806. The subsequent sub-group resource capacity may include a sum of resource capacities of a subset of the resources included in the controlled sub-group for the next control sub-slot. It may be determined whether the subsequent sub-group resource capacity is greater than or equal to an energy target, which may be modified for the next controlled sub-slot, as described with reference to block 810. In response to a determination that the updated sub-group resource capacity is greater than or equal to the energy target ("YES" at block 810), a command signal may be communicated to the resources in the controlled sub-group, as described with reference to block 818. The method 800 may continue to proceed through one or more of blocks 802, 804, 806, 808, 810, 812, 814, 816, 818, 820, and 822 until an energy balance event concludes or substantially continuously.

At block 834, it may be determined whether the sub-group resource capacity is equal to the updated energy target. In response to the sub-group resource capacity not being equal to the updated energy target ("NO" at block 834) the method 800 may proceed to block 836. In response to the sub-group resource capacity being equal to the updated energy target ("YES" at block 834) the method 800 may proceed to block 838 in which the method 800 may end. At block 836, a most recently added resource may be removed from the controlled sub-group. From block 836, the method 800 may proceed to block 832.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 9:
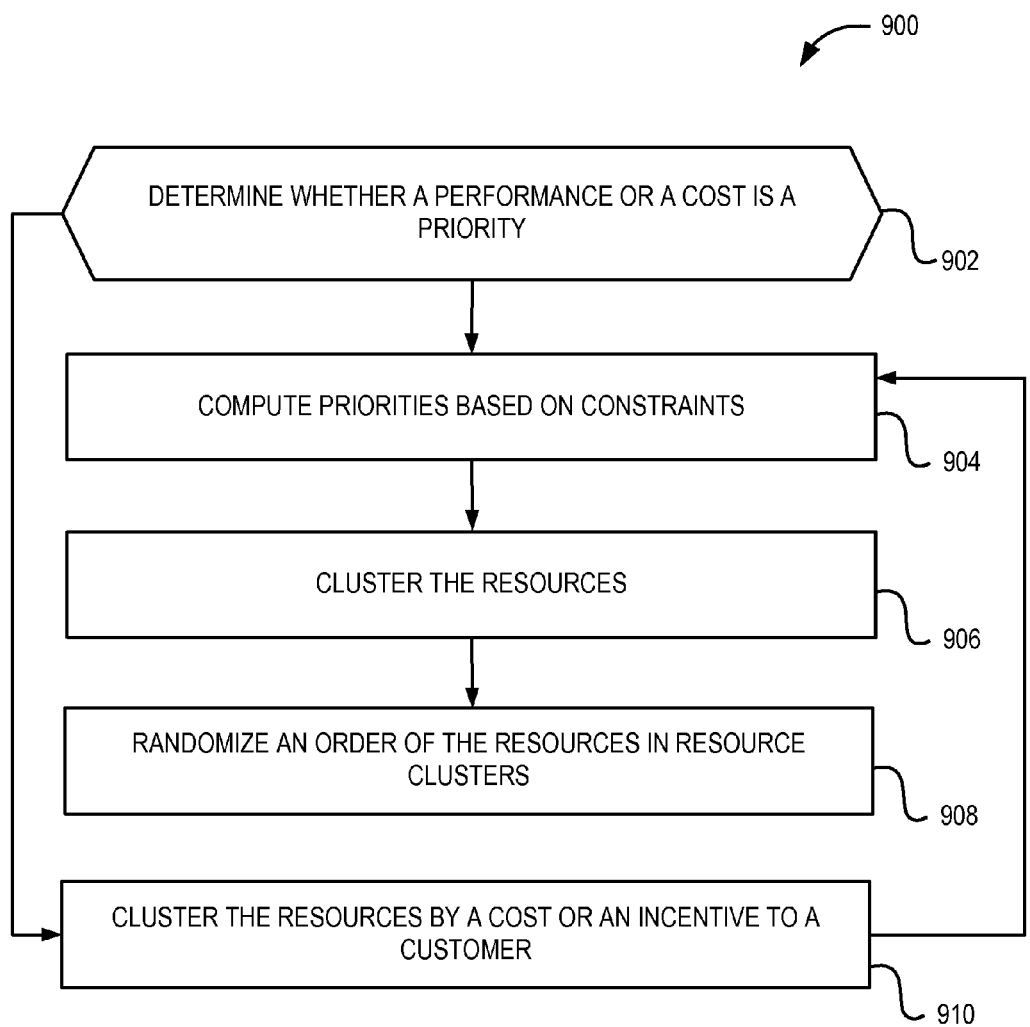
FIG. 9 is a flow diagram of an example method of priority list creation.

FIG. 9 is a flow diagram of another example method 900 of priority list creation, arranged in accordance with at least one embodiment described herein. The method 900 may be performed in a distribution system such as the distribution system 100 of FIG. 1 in which the utility 104 provides energy to the sites 130. Similar methods may be implemented with necessary modifications in systems in which other resources are provided by the utility 104.

The method 900 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 1108 of FIG. 11) having stored thereon programming code or instructions that are executable by one or more processors (such as the processor 1104 of FIG. 11) to cause a computing system and/or the controller server 106 to perform or control performance of the method 900. Additionally or alternatively, the controller server 106 may include the processor 1104 of FIG. 11 that is configured to execute computer instructions to cause the controller server 106 or another computing system to perform or control performance of the method 900. Although illustrated as discrete blocks, various blocks may be divided into additional blocks, combined into fewer blocks, or eliminated, depending on the desired implementation. In some embodiments, one or more of the blocks of method 900 may be incorporated in another method or process. For example, the method 900 may be incorporated in block 804 of the method 800.

The method 900 may begin at block 902 in which a determination may be made whether a performance or a cost is a priority. For instance, one or more resources may be included in a VPP. The performance of the VPP may be the priority. In response to the performance being the priority, the method 900 may proceed to block 904. In response to the cost being the priority, the method 900 may proceed to block 910.

At block 904, priority statuses may be computed based on one or more constraints. For example, the constraints may include mandatory constraints. Some examples of the mandatory constraints may include a minimum amount of time between turning a resource from on to off or vice versa, a number of consecutive time slots in which one or more of the resources may be off, a number of consecutive time slots in which one or more of the resources may be off, a fraction of time one or more of the resources must be on, a fraction of time slots over some period of time that one or more of the resources must be on, and a post-control of a resource constraint. The constraints may also include soft constraints. The soft constraints may include a number of days or hours per year that a customer are expected to participate in a balance event or in a VPP (e.g., per a contract with VPP provider or government regulations).

At block 906, the resources may be clustered. In some embodiments, the resources may be clustered based on the computed priorities. For example, computed priorities within a range such as a range of 0.25 may be clustered together. In some embodiments, the resources may be clustered based on an end time in which a currently available interval ends for the resources, a number of event participations, a cost imposed on a utility and/or an incentive provided to a customer (e.g., the customer 120), an energy amount that the resource is able to generate or curtail, or some combination thereof.

At block 908, an order of the resources may be randomized in each resource cluster. At block 910, resources may be clustered by a cost or an incentive to a customer. From block 910, the method 900 may proceed to blocks 904, 906, and 908. In circumstances in which the method 900 proceeds through block 910, blocks 904, 906, and 908 are performed within the clusters formed based on the cost or the incentive.

Following the randomizing the resource clusters, the resources may be further ordered on the priority list according to one or more constraints. For example, the resources may be arranged based on a time in which a currently available interval of the resource ends. The arrange resources may be organized based on a number of event participations of the resources. Among resources with comparable event participations, the resources may be further sorted based on the resource capacity. In addition, the resources may include a resource type and the resources of a first resource type may be ordered above the resources of a second resource type.

Figure 10:
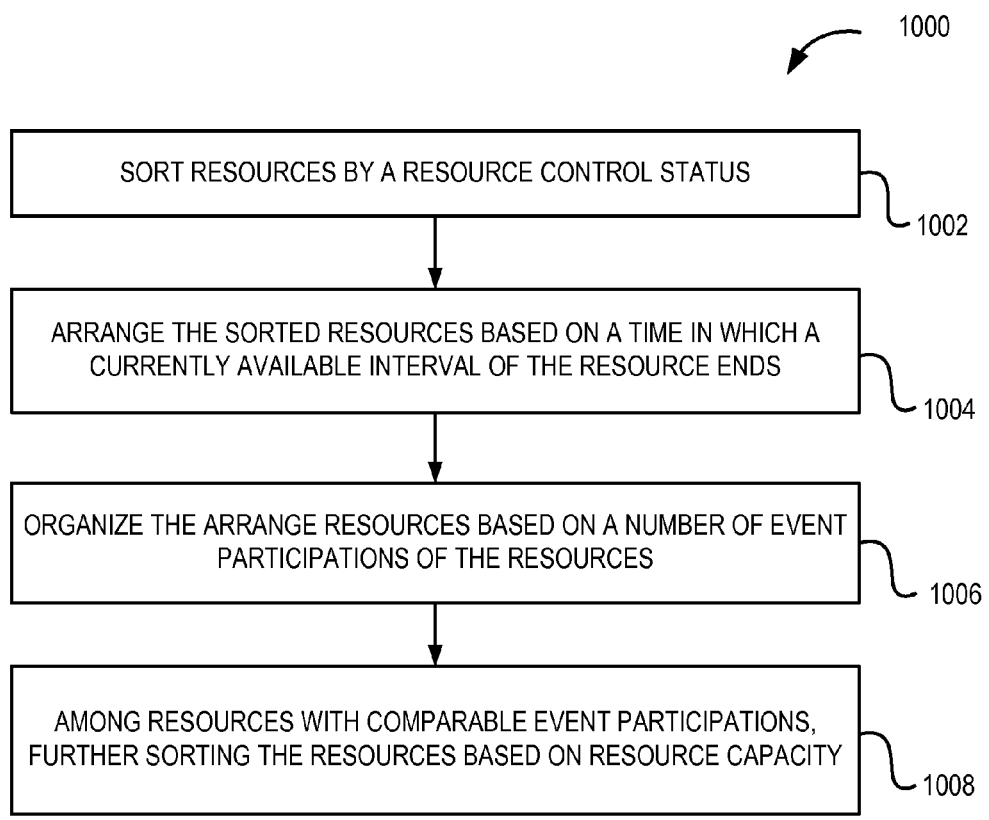
FIG. 10 is a flow diagram of another example method of priority list creation.

FIG. 10 is a flow diagram of an example method 1000 of priority list creation, arranged in accordance with at least one embodiment described herein. The method 1000 may be performed in a distribution system such as the distribution system 100 of FIG. 1 in which the utility 104 provides energy to the sites 130. Similar methods may be implemented with necessary modifications in systems in which other resources are provided by the utility 104.

The method 1000 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 1108 of FIG. 11) having stored thereon programming code or instructions that are executable by one or more processors (such as the processor 1104 of FIG. 11) to cause a computing system and/or the controller server 106 to perform or control performance of the method 800. Additionally or alternatively, the controller server 106 may include the processor 1104 of FIG. 11 that is configured to execute computer instructions to cause the controller server 106 or another computing system to perform or control performance of the method 1000. Although illustrated as discrete blocks, various blocks may be divided into additional blocks, combined into fewer blocks, or eliminated, depending on the desired implementation. In some embodiments, one or more of the blocks of method 1000 may be incorporated in another method or process. For example, the method 1000 may be incorporated in block 804 of the method 800.

The method 1000 may begin at block 1002 in which the resources may be sorted by a resource control status. The resource control status may denote a control status of the resources during a control sub-slot. In some embodiment, the resource control status may include a first resource control status, a second resource control status, a third resource control status, and a fourth resource control status. The first resource control status may denote a resource with cycling behavior that has not been turned off a maximum percentage of time allowed, and the resource is to be turned off in the control sub-slot to increase energy balance capacity. The second resource control status may denote that it is desirable to turn off the resource in the control sub-slot to increase program benefits for a utility. The third resource control status may denote that it is desirable that the resource is controlled again within the next few (e.g., one to three) hours. The fourth resource control status may denote that it is desirable that the resource is controlled again within the same day.

In these and other embodiments, the resources may be sorted such that the resources with the first resource control status are prior to the resources with the second resource control status, the resources with the second resource control status are prior to the resources with the third resource control status, and the resources with the third resource control status are prior to the resources with the fourth resource control status. As used to describe the method 1000, the phrase "prior to" is used to indicate that a resource appears higher on the priority list, which may result in the resource being introduced into the controlled sub-group ahead of a resource that lower on the priority list.

At block 1004, the sorted resources may be arranged based on a time in which a currently available interval of the resource ends. In some embodiments, the sorted resources may be arranged such that the resources with earlier-ending available intervals are prior to the resources with later-ending available intervals.

At block 1006, the arrange resources may be organized based on a number of event participations of the resources. In some embodiments, the arranged resources may be organized such that the resources that have participated in fewer balance events are prior to the resources that have participated in more balance events.

At block 1008, among resources with comparable event participations, the resources may be further sorted based on the resource capacity. In some embodiments, the resources may be further sorted such that the resources having larger resource capacities are prior to the resources having smaller resource capacities.

Figure 11:
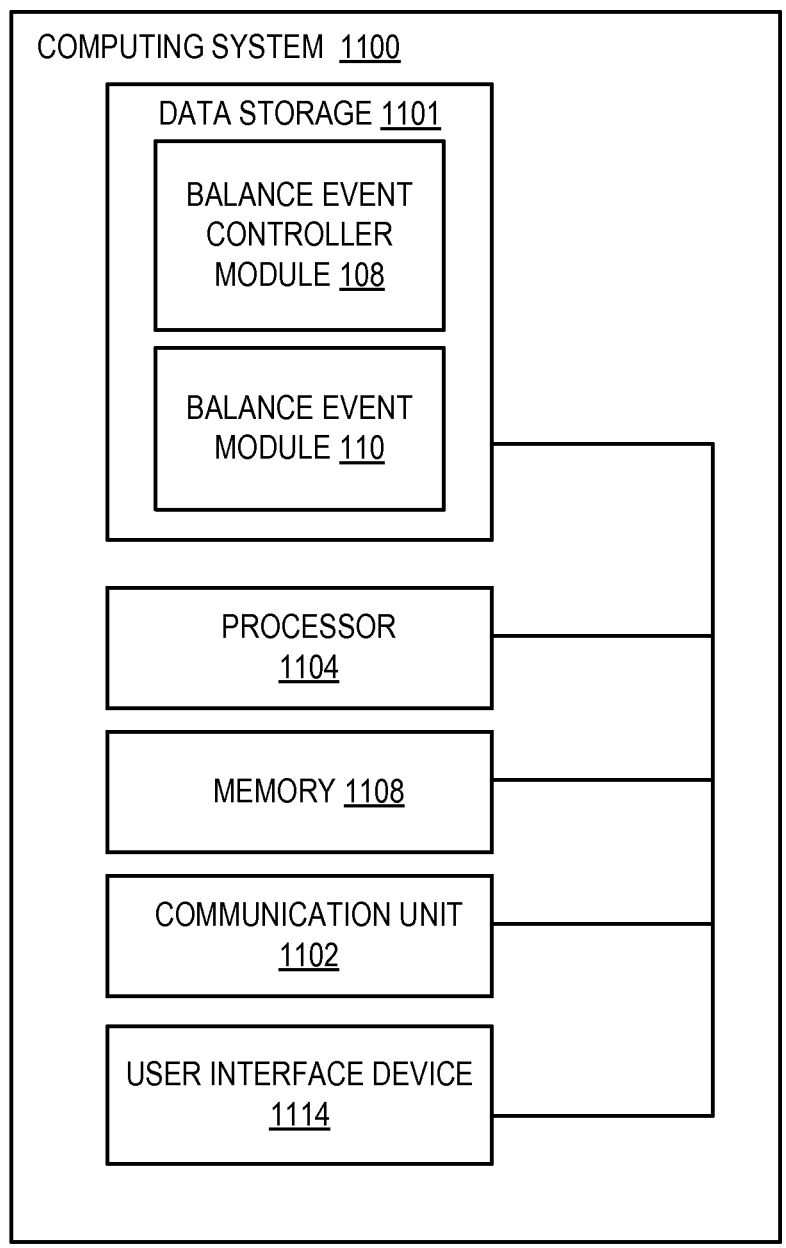
FIG. 11 illustrates an example computing system configured for resource selection in a micro-balance event, all arranged in accordance with at least one embodiment described herein.

FIG. 11 illustrates an example computing system 1100 configured for resource selection in a micro-balance event. The computing system 1100 may be implemented in the distribution system 110 of FIG. 1. Examples of the computing system 1100 may include one or both of the controller server 116 or the resources 112. The computing system 1100 may include one or more processors 1104, a memory 1108, a communication unit 1102, a user interface device 1114, and a data storage 1101 that includes one or both of the controller module 108 and the balance event module 110 (collectively, modules 108/110).

The processor 1104 may include any suitable special-purpose or general-purpose computer, computing entity, or processing device including various computer hardware or software modules and may be configured to execute instructions stored on any applicable computer-readable storage media. For example, the processor 1104 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 11, the processor 1104 may more generally include any number of processors configured to perform individually or collectively any number of operations described in the present disclosure. Additionally, one or more of the processors 1104 may be present on one or more different electronic devices or computing systems. In some embodiments, the processor 1104 may interpret and/or execute program instructions and/or process data stored in the memory 1108, the data storage 1101, or the memory 1108 and the data storage 1101. In some embodiments, the processor 1104 may fetch program instructions from the data storage 1101 and load the program instructions in the memory 1108. After the program instructions are loaded into the memory 1108, the processor 1104 may execute the program instructions.

The memory 1108 and the data storage 1101 may include computer-readable storage media for carrying or having computer-executable instructions or data structures stored thereon. Such computer-readable storage media may include any available media that may be accessed by a general-purpose or special-purpose computer, such as the processor 1104. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 1104 to perform a certain operation or group of operations.

The communication unit 1102 may include one or more pieces of hardware configured to receive and send communications. In some embodiments, the communication unit 1102 may include one or more of an antenna, a wired port, and modulation/demodulation hardware, among other communication hardware devices. In particular, the communication unit 1102 may be configured to receive a communication from outside the computing system 1100 and to present the communication to the processor 1104 or to send a communication from the processor 1104 to another device or network.

The user interface device 1114 may include one or more pieces of hardware configured to receive input from and/or provide output to a user. In some embodiments, the user interface device 1114 may include one or more of a speaker, a microphone, a display, a keyboard, a touch screen, or a holographic projection, among other hardware devices. In these and other embodiments, the user interface device 1114 may be configured to receive input from a customer (e.g., 120) or administrator of a utility (e.g., 104), for example.

The modules 108/110 may include program instructions stored in the data storage 1101. The processor 1104 may be configured to load the modules 108/110 into the memory 1108 and execute the modules 108/110. Alternatively, the processor 1104 may execute the modules 108/110 line-by-line from the data storage 1101 without loading them into the memory 1108. When executing the modules 108/110 the processor 1104 may be configured for performance of a micro-balance event resource selection process as described elsewhere in this disclosure.

Modifications, additions, or omissions may be made to the computing system 1100 without departing from the scope of the present disclosure. For example, in some embodiments, the computing system 1100 may not include the user interface device 1114. In some embodiments, the different components of the computing system 1100 may be physically separate and may be communicatively coupled via any suitable mechanism. For example, the data storage 1101 may be part of a storage device that is separate from a server, which includes the processor 1104, the memory 1108, and the communication unit 1102, that is communicatively coupled to the storage device.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage resources, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing resource to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of resource selection for a control sub-slot of a micro-balance event, the method comprising:
computing availability schedules for one or more resources;
sorting the resources by a resource control status that denotes a control status of the resources in the control sub-slot, wherein the control sub-slot represents a period of time during which one or more resources are controlled in a particular operational state and the resource control status includes:
a first resource control status that denotes a resource with cycling behavior that has not been turned off a maximum percentage of time allowed, and is to be turned off in the control sub-slot to increase energy balance capacity;
a second resource control status that denotes that it is desirable to turn off in the control sub-slot to increase program benefits for a utility;
a third resource control status that denotes that it is desirable for the resource to be controlled again within a next one or more hours; and
a fourth resource control status that denotes that it is desirable that the resource is controlled again within a same day;
creating a priority list of the sorted resources based on one or more prioritization rules and the availability schedules, the priority list including an order in which the resources are added to a controlled sub-group of the resources that are controlled during the control sub-slot;
calculating a sub-group resource capacity that includes a sum of resource capacities of a subset of the resources included in the controlled sub-group;
receiving an energy target that includes an energy amount to be balanced during the micro-balance event;
determining whether the sub-group resource capacity is greater than or equal to the energy target;
in response to a determination that the sub-group resource capacity is less than the energy target, adding one of the resources that has a first position on the priority list to the controlled sub-group and calculating an updated sub-group resource capacity that includes the sub-group resource capacity and a resource capacity of the added resource;
determining whether the updated sub-group resource capacity is greater than or equal to the energy target; and
in response to a determination that the updated sub-group resource capacity is greater than or equal to the energy target, transitioning an operational state of the resources in the controlled sub-group to implement the micro-balance event by communicating a command signal to the resources that controls an operational state of the resources to affect energy use or energy production of the resources.

2. The method of claim 1, further comprising:
updating resource control status of a next control sub-slot of the resources in the controlled sub-group; and
updating a number of event participations of the resources in the controlled sub-group.

3. The method of claim 1, wherein:
the creating includes:
arranging the sorted resources based on a time in which a currently available interval of the resource ends such that the resources with earlier-ending available intervals are prior to the resources with later-ending available intervals;
organizing the arranged resources based on a number of event participations of the resources such that the resources that have participated in fewer balance events are prior to the resources that have participated in more balance events; and
among resources with comparable event participations, further sorting the resources based on the resource capacity such that the resources having larger resource capacities are prior to the resources having smaller resource capacities,
wherein:
the sorting of the resources is such that the resources with the first resource control status are prior to the resources with the second resource control status, the resources with the second resource control status are prior to the resources with the third resource control status, and the resources with the third resource control status are prior to the resources with the fourth resource control status.

4. The method of claim 1, wherein the creating includes:
determining whether a performance or a cost is a priority; and
in response to the performance being the priority:
computing priorities based on constraints;
clustering the resources based on the computed priorities; and
randomizing an order of the resources in resource clusters.

5. The method of claim 4, wherein in response to the cost being the priority, the creating includes:
clustering the resources by a cost or an incentive to a customer;
computing priorities based on constraints;
clustering the resources based on the computed priorities; and
randomizing an order of the resources in resource clusters.

6. The method of claim 1, further comprising:
receiving one or both of actual load data and actual generation data from one or more sites;
updating an energy target based on the received load data, the received generation data, or both the received load data and the received generation data;
further updating the energy target based on a remaining number of control sub-slots;
determining whether the sub-group resource capacity is smaller than the updated energy target;
in response to the sub-group resource capacity being smaller than the updated energy target, adding one of the resources that has the first position on the priority list to the controlled sub-group;
in response to the sub-group resource capacity not being smaller than the updated energy target, determining whether the sub-group resource capacity is equal to the updated energy target; and
in response to the sub-group resource capacity not being equal to the updated energy target, removing a most recently added resource from the controlled sub-group.

7. The method of claim 1, wherein:
the resources include one or more or a combination of an air conditioner, a photovoltaic panel, and an electric vehicle that are included in a virtual power plant (VPP); and
the micro-balance event includes a portion of a substantially continuous balance event.

8. The method of claim 1, wherein:
the resources each include a resource type; and
the resources of a first resource type are ordered above the resources of a second resource type.

9. The method of claim 1, wherein the prioritization rules are based on one or more of a combination of:
resource types,
locations of the resources,
resource constraints,
customer constraints, and
program constraints.

10. The method of claim 1, further comprising for a next control sub-slot:
creating a subsequent priority list of the resources;
calculating a subsequent sub-group resource capacity that includes a sum of resource capacities of a subset of the resources included in the controlled sub-group;
determining whether the subsequent sub-group resource capacity is greater than or equal to the energy target; and
in response to a determination that the updated sub-group resource capacity is greater than or equal to the energy target, communicating a command signal to the resources in the controlled sub-group.

11. A non-transitory computer-readable medium having encoded therein programming code executable by a processor to perform or control performance of operations comprising:
computing availability schedules for one or more resources;
sorting the resources by a resource control status that denotes a control status of the resources in a control sub-slot, wherein the control sub-slot represents a period of time during which one or more resources are controlled in a particular operational state and the resource control status includes:
a first resource control status that denotes a resource with cycling behavior that has not been turned off a maximum percentage of time allowed, and is to be turned off in the control sub-slot to increase energy balance capacity;
a second resource control status that denotes that it is desirable to turn off in the control sub-slot to increase program benefits for a utility;
a third resource control status that denotes that it is desirable for the resource to be controlled again within a next one or more hours; and
a fourth resource control status that denotes that it is desirable that the resource is controlled again within a same day;
creating a priority list of the sorted resources based on one or more prioritization rules and the availability schedules, the priority list including an order in which the resources are added to a controlled sub-group of the resources that are controlled during the control sub-slot;
calculating a sub-group resource capacity that includes a sum of resource capacities of a subset of the resources included in the controlled sub-group;
receiving an energy target that includes an energy amount to be balanced during a micro-balance event;
determining whether the sub-group resource capacity is greater than or equal to the energy target;
in response to a determination that the sub-group resource capacity is less than the energy target, adding one of the resources that has a first position on the priority list to the controlled sub-group and calculating an updated sub-group resource capacity that includes the sub-group resource capacity and a resource capacity of the added resource;
determining whether the updated sub-group resource capacity is greater than or equal to the energy target; and
in response to a determination that the updated sub-group resource capacity is greater than or equal to the energy target, transitioning an operational state of the resources in the controlled sub-group to implement the micro-balance event by communicating a command signal to the resources that controls an operational state of the resources to affect energy use or energy production of the resources.

12. The non-transitory computer-readable medium of claim 11, wherein the operations further comprise:
updating resource control status of a next control sub-slot of the resources in the controlled sub-group; and
updating a number of event participations of the resources in the controlled sub-group.

13. The non-transitory computer-readable medium of claim 11, wherein:
the creating includes:
arranging the sorted resources based on a time in which a currently available interval of the resource ends such that the resources with earlier-ending available intervals are prior to the resources with later-ending available intervals;
organizing the arranged resources based on a number of event participations of the resources such that the resources that have participated in fewer balance events are prior to the resources that have participated in more balance events; and
among resources with comparable event participations, further sorting the resources based on the resource capacity such that the resources having larger resource capacities are prior to the resources having smaller resource capacities,
wherein:
the sorting of the resources is such that the resources with the first resource control status are prior to the resources with the second resource control status, the resources with the second resource control status are prior to the resources with the third resource control status, and the resources with the third resource control status are prior to the resources with the fourth resource control status.

14. The non-transitory computer-readable medium of claim 11, wherein the creating includes:
determining whether a performance or a cost is a priority; and
in response to the performance being the priority:
computing priorities based on constraints;
clustering the resources based on the computed priorities; and
randomizing an order of the resources in resource clusters.

15. The non-transitory computer-readable medium of claim 14, wherein in response to the cost being the priority, the creating includes:
- clustering the resources by a cost or an incentive to a customer;
- computing priorities based on constraints;
- clustering the resources based on the computed priorities; and
- randomizing an order of the resources in resource clusters.

16. The non-transitory computer-readable medium of claim 11, wherein the operations further comprise:
- receiving one or both of actual load data and actual generation data from one or more sites;
- updating an energy target based on the received load data, the received generation data, or both the received load data and the received generation data;
- further updating the energy target based on a remaining number of control sub-slots;
- determining whether the sub-group resource capacity is smaller than the updated energy target;
- in response to the sub-group resource capacity being smaller than the updated energy target, adding one of the resources that has the first position on the priority list to the controlled sub-group;
- in response to the sub-group resource capacity not being smaller than the updated energy target, determining whether the sub-group resource capacity is equal to the updated energy target; and
- in response to the sub-group resource capacity not being equal to the updated energy target, removing a most recently added resource from the controlled sub-group.

17. The non-transitory computer-readable medium of claim 11, wherein:
- the resources include one or more or a combination of an air conditioner, a photovoltaic panel, and an electric vehicle that are included in a virtual power plant (VPP); and
- the micro-balance event includes a portion of a substantially continuous balance event.

18. The non-transitory computer-readable medium of claim 11, wherein:
- the resources each include a resource type; and
- the resources of a first resource type are ordered above the resources of a second resource type.

19. The non-transitory computer-readable medium of claim 11, wherein the prioritization rules are based on one or more of a combination of:
- resource types,
- locations of the resources, resource constraints,
- customer constraints, and
- program constraints.

20. The non-transitory computer-readable medium of claim 11, wherein the operations further comprise for a next control sub-slot:
- creating a subsequent priority list of the resources;
- calculating a subsequent sub-group resource capacity that includes a sum of resource capacities of a subset of the resources included in the controlled sub-group;
- determining whether the subsequent sub-group resource capacity is greater than or equal to the energy target; and
- in response to a determination that the updated sub-group resource capacity is greater than or equal to the energy target, communicating a command signal to the resources in the controlled sub-group.

\* \* \* \* \*